US012669890B2

(12) United States Patent
Kim

(10) Patent No.: US 12,669,890 B2
(45) Date of Patent: Jun. 30, 2026

(54) IN-CELL TOUCH DISPLAY DEVICE

(71) Applicant: LG Display Co., Ltd., Seoul (KR)

(72) Inventor: Cheolse Kim, Gapyeong-gun (KR)

(73) Assignee: LG Display Co., Ltd., Seoul (KR)

( * ) Notice: Subject to any disclaimer, the term of this patent is extended or adjusted under 35 U.S.C. 154(b) by 35 days.

(21) Appl. No.: 18/941,721

(22) Filed: Nov. 8, 2024

(65) Prior Publication Data

US 2025/0251818 A1 Aug. 7, 2025

(30) Foreign Application Priority Data

Feb. 7, 2024 (KR) ........................ 10-2024-0018755

(51) Int. Cl.
G06F 3/041 (2006.01)

(52) U.S. Cl.
CPC ........ G06F 3/04164 (2019.05); G06F 3/0412 (2013.01)

(58) Field of Classification Search
CPC ........................... G06F 3/04164; G06F 3/0412
See application file for complete search history.

(56) References Cited

U.S. PATENT DOCUMENTS

| | | | |
|---|---|---|---|
| 10,156,749 B2 | 12/2018 | Cho et al. | |
| 10,394,068 B2 | 8/2019 | Cho et al. | |
| 10,935,829 B2 | 3/2021 | Cho et al. | |
| 11,300,824 B2 | 4/2022 | Cho et al. | |
| 11,315,986 B2 * | 4/2022 | Kim ...................... | H10K 59/131 |
| 11,592,699 B2 | 2/2023 | Cho et al. | |
| 12,284,898 B2 * | 4/2025 | Kim ...................... | H10K 59/40 |
| 2017/0131585 A1 | 5/2017 | Cho et al. | |
| 2017/0293395 A1 * | 10/2017 | Kim ...................... | G06F 3/0446 |
| 2019/0094591 A1 | 3/2019 | Cho et al. | |
| 2019/0384085 A1 | 12/2019 | Cho et al. | |
| 2020/0212116 A1 * | 7/2020 | Kim ...................... | H10K 59/122 |
| 2021/0173247 A1 | 6/2021 | Cho et al. | |
| 2022/0206328 A1 | 6/2022 | Cho et al. | |
| 2022/0216271 A1 * | 7/2022 | Kim ...................... | H10K 59/40 |

FOREIGN PATENT DOCUMENTS

KR 10-2559090 B1 7/2023

* cited by examiner

*Primary Examiner* — Peter D McLoone
(74) *Attorney, Agent, or Firm* — Fenwick & West LLP

(57) ABSTRACT

An in-cell touch display device is presented herein in which an in-cell touch sensor technology can be implemented in an organic light emitting diode display panel. The in-cell touch display device may include a substrate, a transistor formation layer on the substrate, the transistor formation layer including a semiconductor, a source electrode connected to the semiconductor, a drain electrode connected to the semiconductor, a gate electrode that overlaps the semiconductor, and a plurality of touch lines, and a light emitting element layer on the transistor formation layer, the light emitting element layer including an anode electrode, an emission layer on the anode electrode, a cathode electrode on the emission layer, and a bank layer on a portion of the anode electrode. The cathode electrode is connected to the plurality of touch lines, and the touch lines are closer to the cathode electrode than to the source and drain electrodes.

20 Claims, 15 Drawing Sheets

● Sensing location

|    | x1   | x2   | x3   | x4   | x5   | x6   |
|----|------|------|------|------|------|------|
| y1 | 0.02 | 0.04 | 0.04 | 0.02 | 0.02 | 0.01 |
| y2 | 0.05 | 0.23 | 0.12 | 0.05 | 0.02 | 0.01 |
| y3 | 0.03 | 0.11 | 0.09 | 0.04 | 0.02 | 0.01 |
| y4 | 0.01 | 0.04 | 0.04 | 0.02 | 0.01 | 0.00 |
| y5 | 0.00 | 0.01 | 0.01 | 0.00 | 0.00 | 0.00 |

IN-CELL TOUCH DISPLAY DEVICE

CROSS-REFERENCE TO RELATED APPLICATION

This application claims the priority of Republic of Korea Patent Application No. 10-2024-0018755, filed on Feb. 7, 2024, which is hereby incorporated by reference in its entirety.

BACKGROUND

Field

The present disclosure relates to an in-cell touch display device.

Description of Related Art

As the information society develops, various types of display devices for displaying images are being developed. In addition, the development of a touch technology for applying a touch-based input method of allowing users to easily, intuitively, and conveniently input information or a command to the display device.

As described above, to apply the touch-based input method to the display device, a touch panel including a touch sensor should be separately manufactured and coupled to a display panel. The method has a disadvantage of increasing the size or thickness of the device and complicating a manufacturing process. Therefore, an in-cell touch sensor technology in which the touch sensor is embedded in the display panel is being developed without separately manufacturing the touch panel.

SUMMARY

A technology having a considerable technical difficulty is to design and manufacture a display panel in which a touch sensor is embedded. In addition, when the touch sensor including a plurality of touch electrodes is embedded in the display panel, since the touch sensor may be located very close to a display driving electrode or a display driving line inside the display panel, the possibility that a parasitic capacitance between the touch sensor and the display driving electrode or a parasitic capacitance between the touch sensor and the display driving line increases can be increased significantly, and an increase in the parasitic capacitance may lead to the degradation of touch sensitivity.

In particular, when an in-cell touch sensor technology is applied to an organic light emitting diode display panel for emitting light by itself, the parasitic capacitance may be further increased due to the structural characteristics of the organic light emitting diode display panel.

Therefore, the present disclosure is directed to providing an in-cell touch display device in which an in-cell touch sensor technology can be implemented in an organic light emitting diode display panel.

The objects of embodiments of the present disclosure are not limited to the above-described objects, and other objects that are not mentioned will be able to be clearly understood by those skilled in the art from the following description.

An in-cell touch display device according to one or more embodiments of the present disclosure may include a substrate, a transistor formation layer on the substrate, the transistor formation layer including a semiconductor, a source electrode connected to the semiconductor, a drain electrode connected to the semiconductor, and a gate electrode that overlaps the semiconductor, and a plurality of touch lines, and a light emitting element layer on the transistor formation layer, the light emitting element layer including an anode electrode, an emission layer on the anode electrode, a cathode electrode on the emission layer, and a bank layer on a portion of the anode electrode, wherein the cathode electrode is connected to a touch line from the plurality of touch lines, and the plurality of touch lines are closer to the cathode electrode than to the source electrode and the drain electrode.

An in-cell touch display device according to one or more other embodiments of the present disclosure may include a display panel including a plurality of sub-pixels having a light emitting element and a thin film transistor, the display panel including a touch line on a backplane of the thin film transistor, and the light emitting element including a cathode electrode connected to the touch line, and a sensing circuit configured to sense a touch signal by amplifying a signal of the touch line, differentiating the amplified signal, integrating to generate an integrated signal, and integrating the integrated signal.

An in-cell touch display device according to one or more other embodiments of the present disclosure may include a substrate; an insulating layer on the substrate; a thin fdm transistor including a semiconductor on the insulating layer, a gate electrode, a source electrode connected to the semiconductor, and a drain electrode connected to the semiconductor; a first planarization layer on the source electrode and the drain electrode; a touch line on the first planarization layer, the touch line non-overlapping with the thin film transistor; a second planarization layer on the first planarization layer and the touch line; a light emitting element on the second planarization layer, the light emitting element including an anode electrode that is connected to the drain electrode, an emission layer on the anode electrode, and a cathode electrode on the emission layer that is connected to the touch line.

DETAILED DESCRIPTION

Figure 1:
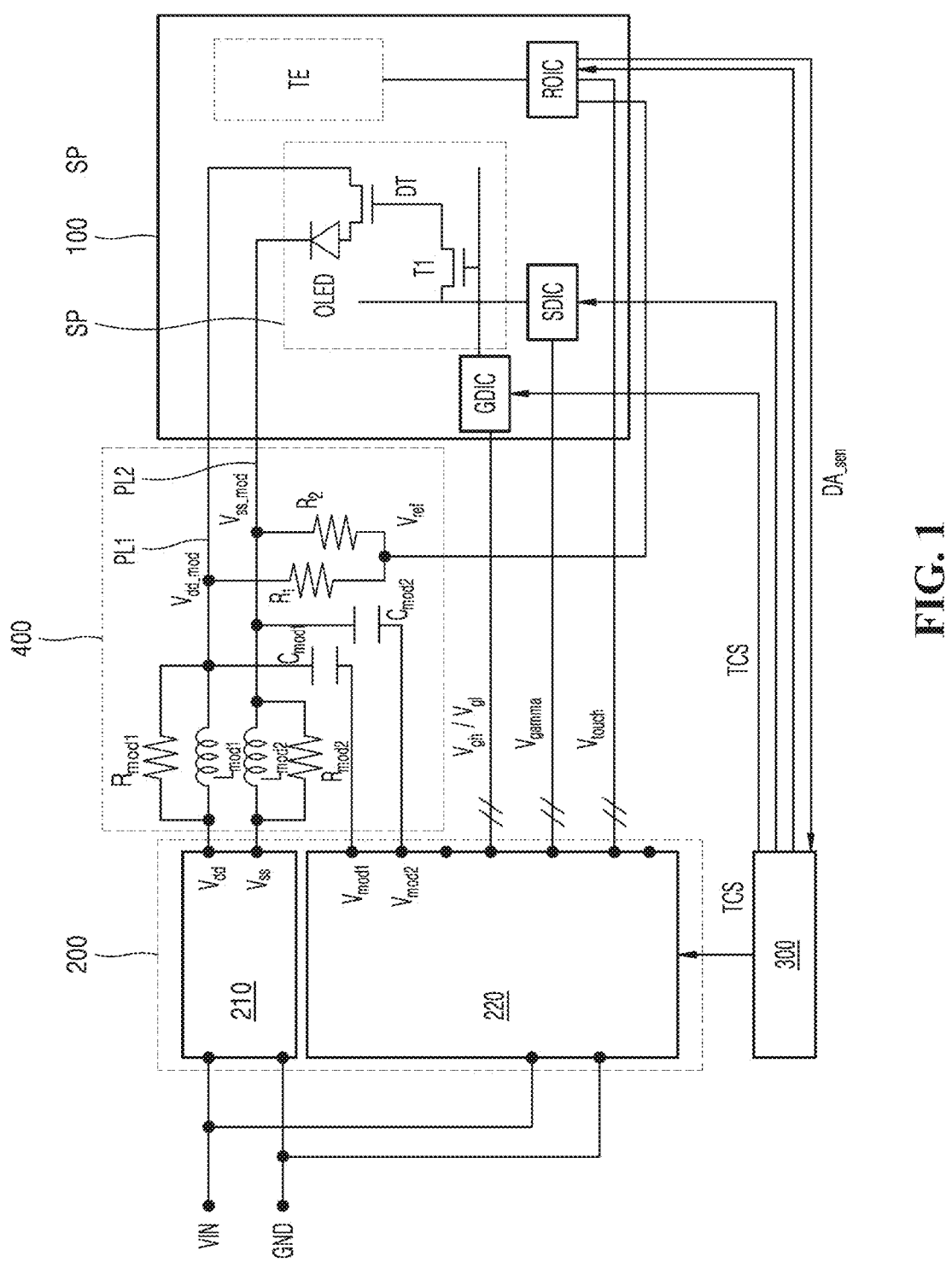
FIG. 1 shows an in-cell touch display device according to one or more embodiments of the present disclosure.

Advantages and features of the present disclosure and methods for achieving them will become clear with reference to embodiments described below in detail in conjunction with the accompanying drawings. However, the present disclosure is not limited to the embodiments disclosed below but can be implemented in various different forms, these embodiments are merely provided to make the disclosure of the present disclosure complete and fully inform those skilled in the art to which the present disclosure pertains of the scope of the present disclosure, and the present disclosure is defined by the scope of the appended claims.

Since shapes, sizes, ratios, angles, numbers, and the like disclosed in the drawings for describing the embodiments of the present disclosure are illustrative, the present disclosure is not limited to the illustrated items. The same reference number indicates the same components throughout the specification. In addition, in describing the present disclosure, when it is determined that the detailed description of a related known technology may unnecessarily obscure the gist of the present disclosure, detailed description thereof will be omitted. When terms "comprises," "has," "includes," and the like described in the present disclosure are used, other parts may be added unless "only" is used. When a component is expressed in the singular, it includes a case in which the component is provided as a plurality of components unless specifically stated otherwise.

In construing a component, the component is construed as including the margin of error even when there is no separate explicit description.

When the temporal relationship is described, for example, when the temporal relationship is described using the term "after," "subsequently," "then," "before," or the like, it may include a non-consecutive case unless the term "immediately" or "directly" is used.

In the description of the signal flow relationship, for example, in the case of "a signal is transmitted from node A to node B," a case where the signal is transmitted from node A to node B via another node may be included unless "immediately" or "directly" is used.

Although terms such as first, second, and the like are used to describe various components, these components are not limited by these terms. The terms are only used to distinguish one component from another. Therefore, a first component described below may be a second component within the technical spirit of the present disclosure.

Features of various embodiments of the present disclosure can be coupled or combined partially or entirely, and various technological interworking and driving are possible, and the embodiments may be implemented independently of each other or implemented together in an associated relationship.

Hereinafter, an in-cell touch display device capable of increasing touch sensitivity and the accuracy of touch recognition according to some embodiments will be described.

Figure 2:
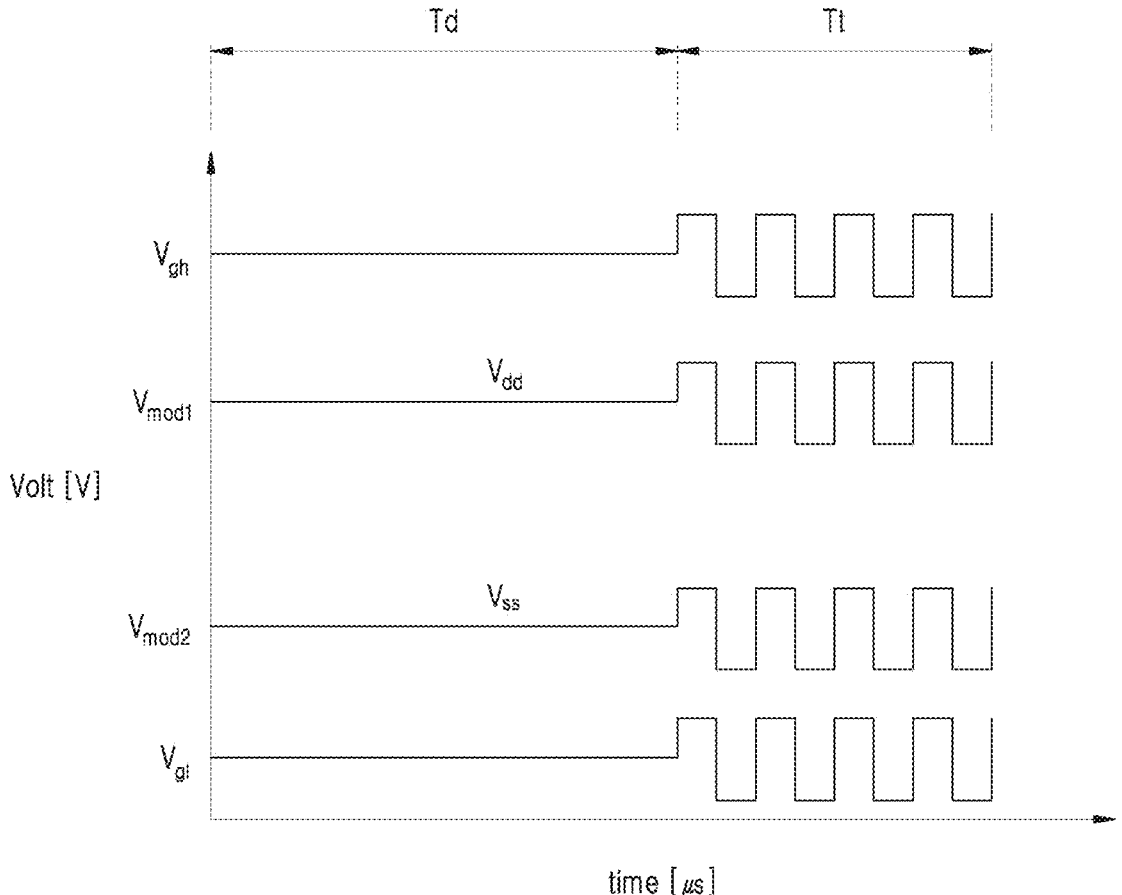
FIG. 2 shows a timing diagram of the in-cell touch display device according to one or more embodiments of the present disclosure.

FIG. 1 shows an in-cell touch display device according to one or more embodiments of the present disclosure. FIG. 2 shows a timing diagram of the in-cell touch display device according to one or more embodiments of the present disclosure.

Referring to FIGS. 1 and 2, the in-cell touch display device may include a display panel 100, a power supply circuit 200, a power modulation circuit 400, a source driver SDIC, a gate driver GDIC, a touch driving circuit ROIC, a controller 300, etc.

The display panel 100 may include a plurality of subpixels SP and a plurality of touch electrodes TE and may be driven in a display period $T_d$ and a touch period $T_t$ in a time-division manner. The plurality of touch electrodes TE may be embedded in a pixel array to detect a touch input.

During the display period $T_d$, a data voltage corresponding to an image signal may be written on the pixel array of the display panel 100, and during th driving time of the touch sensor $T_t$, the touch electrodes TE of the display panel 100 may be driven to detect the touch input.

The power supply circuit 200 may include the first power supply circuit 210 and the second power supply circuit 220.

The first power supply circuit 210 may generate a high potential power voltage $V_{dd}$ and a low potential power voltage $V_{ss}$ based on input power VIN and ground power GND and supply the high potential power voltage $V_{dd}$ and the low potential power voltage $V_{ss}$ to first RLC circuits $R_{mod1}$, $L_{mod1}$, and $C_{mod1}$ and second RLC circuits $R_{mod2}$, $L_{mod2}$, and $C_{mod2}$ of the power modulation circuit 400, respectively.

The second power supply circuit 220 may generate a first modulation control voltage $V_{mod1}$ and a second modulation control voltage $V_{mod2}$ used to modulate the high potential power voltage $V_{dd}$ and the low potential power voltage $V_{ss}$ based on the input power VIN and ground power GND and supply the first modulation control voltage $V_{mod1}$ and the second modulation control voltage $V_{mod2}$ to one ends of the first capacitor $C_{mod1}$ of the first RLC circuit and the second capacitor $C_{mod2}$ of the second RLC circuit, respectively.

During the display period, the second power supply circuit 220 may supply the first modulation control voltage $V_{mod1}$ at the level of the high potential power voltage $V_{dd}$ and supply the second modulation control voltage $V_{mod2}$ at the level of the low potential power voltage $V_{ss}$.

In addition, during the touch period, the second power supply circuit 220 may supply the first modulation control voltage $V_{mod1}$ at a level having a predetermined cycle and amplitude with respect to the level of the high potential power voltage $V_{dd}$ and supply the second modulation control voltage $V_{mod2}$ at a level having a predetermined cycle and amplitude with respect to the level of the low potential power voltage $V_{ss}$.

In addition, during the display period, the second power supply circuit 220 may generate a high potential gate driving voltage $V_{gh}$ and a low potential gate driving voltage $V_{gl}$ based on the input power VIN and the ground power GND and supply the high potential gate driving voltage $V_{gh}$ and the low potential gate driving voltage $V_{gl}$ to the gate driver GDIC.

In addition, during the display period, the second power supply circuit 220 may supply a gamma voltage $V_{gamma}$ to the source driver SDIC based on the input power VIN and the ground power GND.

In addition, during the touch period, the second power supply circuit 220 may modulate the high potential gate driving voltage $V_{gh}$ into the level having the predetermined cycle and amplitude with respect to the high potential gate driving voltage $V_{gh}$ and modulate the low potential gate driving voltage $V_{gl}$ into the level having the predetermined cycle and amplitude with respect to the low potential gate driving voltage $V_{gl}$, and supply the modulated high potential and low potential gate driving voltages to the gate driver GDIC.

In addition, during the touch period, the second power supply circuit 220 may supply a touch driving voltage $V_{touch}$ having a predetermined cycle and amplitude to the touch driving circuit ROIC for sensing a change in capacitance of the touch electrode TE.

In addition, the second power supply circuit 220 may modulate the gamma voltage $V_{gamma}$ into a level having a predetermined cycle and amplitude with respect to the gamma voltage $V_{gamma}$ and supply the modulated gamma voltage to the source driver SDIC.

The power modulation circuit 400 may include the first RLC circuits $R_{mod1}$, $L_{mod1}$, and $C_{mod1}$ and in which the resistor, the inductor, and the capacitor are connected in parallel to each of the high potential power line PL1 to which the high potential power voltage $V_{dd}$ are supplied in the display panel 100; and the second RLC circuits Rmod2, Lmod2, and Cmod2 in which the resistor, the inductor, and the capacitor are connected in parallel to the low potential power line PL2 to which the low potential power voltage Vss are supplied in the display panel 100.

During the touch period, the power modulation circuit 400 may modulate the high potential power voltage $V_{dd}$ and the low potential power voltage $V_{ss}$ into a high potential modulation voltage $V_{dd\_mod}$ and a low potential modulation voltage $V_{ss\_mod}$ that have a resonance frequency of the resistor, the inductor, and the capacitor and supply the high potential modulation voltage $V_{dd\_mod}$ and the low potential modulation voltage $V_{ss\_mod}$ to a plurality of sub-pixels SP of the display panel 100.

During the touch period, the first RLC circuits $R_{mod1}$, $L_{mod1}$, and $C_{mod1}$ may receive the first modulation control voltage $V_{mod1}$ having a predetermined cycle and amplitude through one end of the first capacitor $C_{mod1}$. During the touch period, the second RLC circuits $R_{mod2}$, $L_{mod2}$, and $C_{mod2}$ may receive the second modulation control voltage $V_{mod2}$ having the predetermined cycle and amplitude through the one end of the second capacitor $C_{mod2}$.

Here, during the display period, the first modulation control voltage $V_{mod1}$ may be applied at the level of the high potential power voltage $V_{dd}$, and the second modulation control voltage $V_{mod2}$ may be applied at the level of the low potential power voltage $V_{ss}$.

In addition, during the touch period, the first modulation control voltage $V_{mod1}$ may be applied at the level having the predetermined cycle and amplitude with respect to the level of the high potential power voltage $V_{dd}$, and the second modulation control voltage $V_{mod2}$ may be applied at the level having the predetermined cycle and amplitude with respect to the level of the low potential power voltage $V_{ss}$.

The first RLC circuits $R_{mod1}$, $L_{mod1}$, and $C_{mod1}$ may include the first resistor $R_{mod1}$ having one end connected to an output terminal of the high potential power voltage $V_{dd}$ and the other end connected to a driving transistor DT of the sub-pixel SP, the first inductor Lmod1 having one end connected to the output terminal of the high potential power voltage $V_{dd}$ and the other end connected to the driving transistor DT of the sub-pixel SP, and the first capacitor $C_{mod1}$ having one end connected to the output terminal of the first modulation control voltage $V_{mod1}$ and the other end connected to the driving transistor DT of the sub-pixel SP.

The second RLC circuits $R_{mod2}$, $L_{mod2}$, and $C_{mod2}$ may include the second resistor $R_{mod2}$ having one end connected to an output terminal of the lower potential power voltage $V_{ss}$ and the other end connected to a light emitting element OLED of the sub-pixel SP, the second inductor $L_{mod2}$ having one end connected to the output terminal of the low potential power voltage $V_{ss}$ and the other end connected to the light emitting element OLED of the sub-pixel SP, and the second capacitor $C_{mod2}$ having one end connected to the output terminal of the second modulation control voltage $V_{mod2}$ and the other end connected to the light emitting element OLED of the sub-pixel SP.

The power modulation circuit 400 may further include a first distribution resistor $R_1$ having one end connected to the first power line PL1 and the other end connected to an output terminal of a reference voltage $V_{ref}$, and a second distribution resistor $R_2$ having one end connected to the second power line PL2 and the other end connected to the output terminal of the reference voltage $V_{ref}$.

A node between the first distribution resistor R1 and the second distribution resistor $R_2$ is the output terminal of the reference voltage $V_{ref}$, and the output terminal of the reference voltage $V_{ref}$ may be connected to an input terminal of the touch driving circuit ROIC for sensing a change in capacitance of the touch electrode TE.

Here, during the touch period, the reference voltage $V_{ref}$ may be modulated into a level having the same cycle and amplitude as the high potential modulation voltage $V_{dd\_mod}$ and the low potential modulation voltage $V_{ss\_mod}$ that are modulated by the first RLC circuits $R_{mod1}$, $L_{mod1}$, and $C_{mod1}$ and the second RLC circuits $R_{mod2}$, $L_{mod2}$, and $C_{mod2}$.

The source driver SDIC may modulate input image data into the corresponding data voltage using the gamma voltage $V_{gamma}$ and supply the data voltage to a source electrode of a scan transistor T1 of the sub-pixel SP through a data line of the display panel 100.

The gate driver GDIC may generate a scan signal using the high potential gate driving voltage $V_{gh}$ and the low potential gate driving voltage $V_{gl}$ and supply the scan signal to a gate electrode of the scan transistor T1 of the sub-pixel SP through a gate line of the display panel 100.

The touch driving circuit ROIC may generate a touch driving signal having the same cycle and amplitude as the high potential modulation voltage $V_{dd\_mod}$ and the low potential modulation voltage $V_{ss\_mod}$ using the touch driving voltage $V_{touch}$ and supply the touch driving signal to a plurality of touch electrodes TE of the display panel 100.

In addition, the touch driving circuit ROIC may detect a change in capacitance of the touch electrode TE, modulate a detection voltage into detection data DA_sen, which is a digital signal, and provide the detection data DA_sen to the controller 300.

The controller 300 may control operation timings of the second power supply circuit 220, the gate driver GDIC, the source driver SDIC, and the touch driving circuit ROIC using a touch control signal TCS.

Figure 3A:
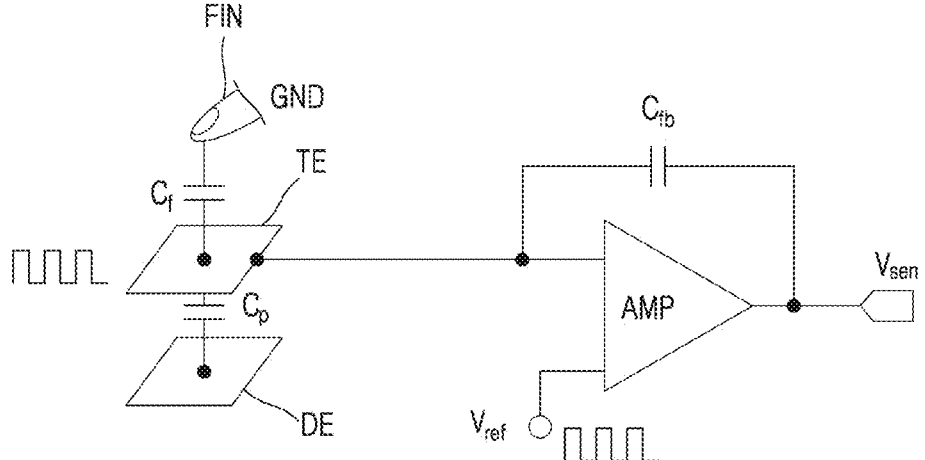
FIGS. 3A and 3B show a sensing circuit and a touch driving state of a touch driving circuit according to a first embodiment of the present disclosure.
Figure 3B:
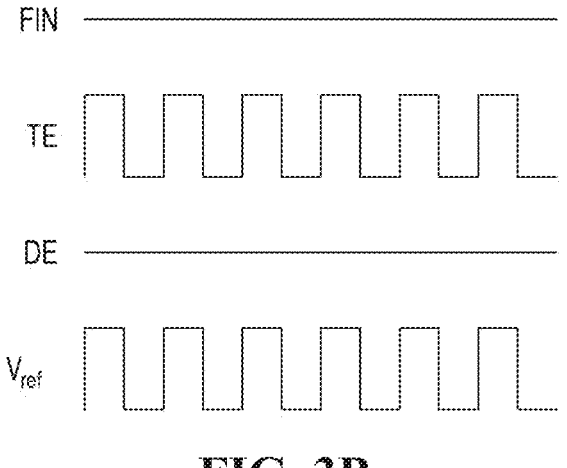

FIGS. 3A and 3B show a sensing circuit and a touch driving state of a touch driving circuit according to a first embodiment of the present disclosure.

In the case of an in-cell touch technology in which the touch electrode TE is designed directly on a backplane of the thin film transistor of the organic light emitting diode display panel, a distance between the touch electrode TE and a display electrode DE is relatively decreased, thereby greatly increasing the parasitic capacitance between the two electrodes.

In the case of add-on, the distance between the touch electrode TE and the display electrode DE is proportional to the thickness of the substrate of the touch electrode TE and has a value of about 500 um. On the other hand, in the case of in-cell touch, a distance between the touch electrode and the display electrode is very small at a level of about ~μm, thereby increasing a parasitic capacitance of a parasitic capacitor $C_p$ and degrading touch performance.

Here, the display electrode DE may be defined as an electrode or line for display driving in the display panel 100.

As shown in FIGS. 3A and 3B, when charges of the touch electrode TE are sensed by modulating the reference voltage $V_{ref}$, the amount of charges accumulated in a feedback capacitor $C_{fb}$ may become $(C_p+C_f)*V_{ref}$.

In this case, since the amount of charges that may be accumulated in the feedback capacitor $C_{fb}$ is limited, as the parasitic capacitance of the parasitic capacitor $C_p$ increases, the amount of charges that may be accumulated in the feedback capacitor Ct becomes relatively small, thereby degrading touch performance.

As described above, when the in-cell touch is designed in the organic light emitting diode display panel, the parasitic capacitance of the touch electrode TE may become very large, thereby degrading touch performance, and consumed power may increase because a very great parasitic capacitance should be filled. In addition, the driving voltage of the touch electrode may distort the display signal through the coupling capacitor with an adjacent display electrode, thereby degrading image quality. In addition, when the display and touch are driven simultaneously, the display electrode DE and the touch electrode TE are mutually influenced by the parasitic capacitance, thereby degrading image quality and touch performance at the same time.

The present disclosure provides an in-cell touch display device capable of increase touch sensitivity and the accuracy of touch recognition even when an in-cell touch sensor technology is applied to the organic light emitting diode display panel.

Figure 4A:
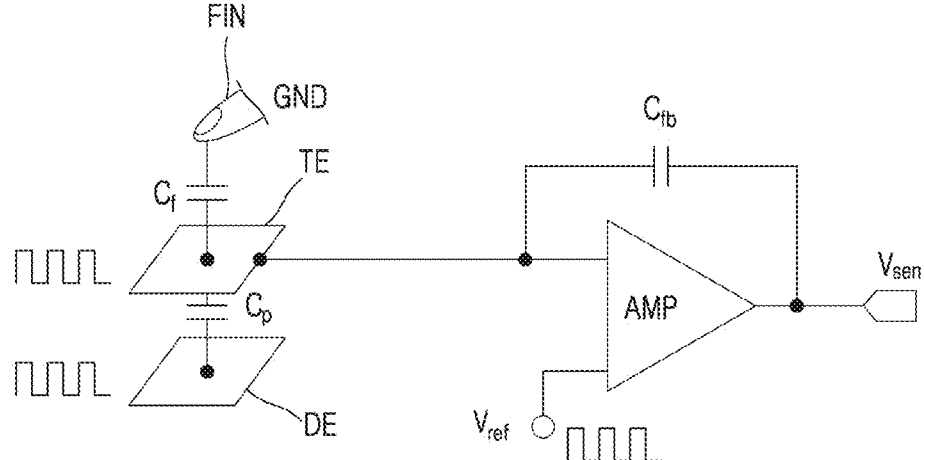
FIGS. 4A and 4B show a sensing circuit and a touch driving state of a touch driving circuit according to a second embodiment of the present disclosure.
Figure 4B:
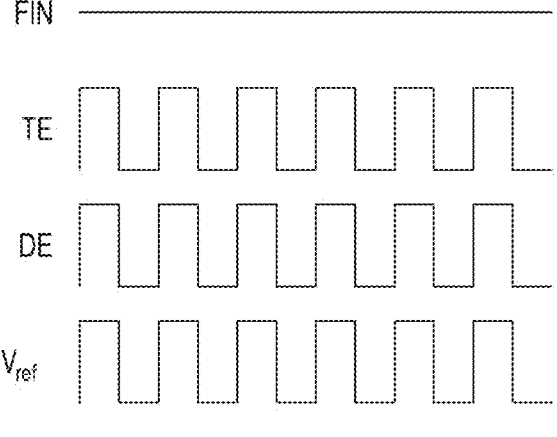

FIGS. 4A and 4B show a sensing circuit and a touch driving state of a touch driving circuit according to a second embodiment of the present disclosure.

Referring to FIGS. 4A and 4B, when a driving voltage having the same cycle and amplitude is applied to the touch electrode TE and the display electrode DE, there is no voltage difference between the electrodes of the parasitic capacitor $C_p$, and thus there is no change in amount of charges charged in the parasitic capacitor $C_p$.

On the other hand, in the case of a finger capacitor Cf between the finger FIN and the touch electrode TE, since one side is in the ground GND state, and the driving voltage is applied to the other side, the amount of charges charged in the finger capacitor $C_f$ is proportional to the driving voltage.

Figure 5A:
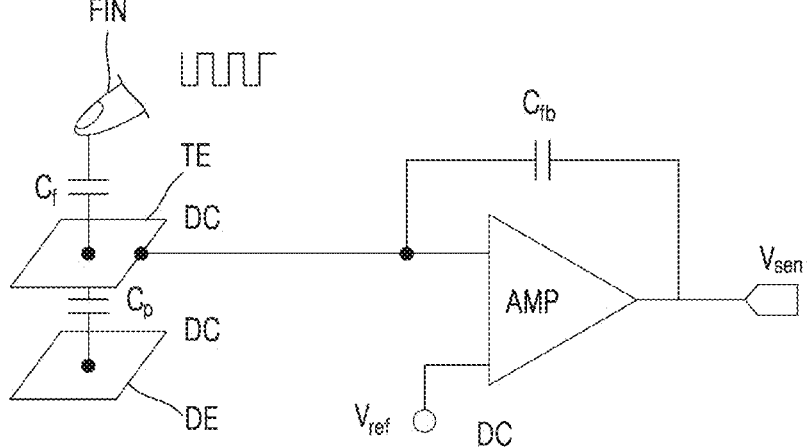
FIGS. 5A and 5B show an equivalent circuit and the touch driving state of the touch driving circuit according to the second embodiment of the present disclosure.
Figure 5B:
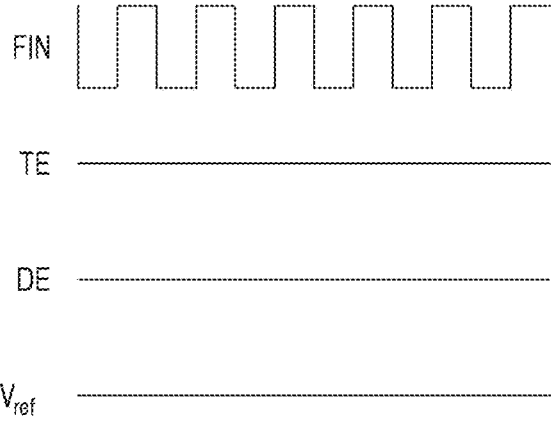

FIGS. 5A and 5B show an equivalent circuit and the touch driving state of the touch driving circuit according to the second embodiment of the present disclosure.

Referring to FIGS. 5A and 5B, since the voltage is relative, it may be considered equivalent to the case where the driving voltage in a form of pulse is applied to only a ground electrode of the finger FIN in a state in which the touch electrode TE, the display electrode DE, and an input terminal of the reference voltage $V_{ref}$ are DC.

The amount of charges sensed at this time may be represented by the product of the driving voltage generated from the finger FIN and the capacitance of the finger capacitor $C_f$.

Therefore, when the touch electrode TE, the display electrode DE, and the input terminal of the reference voltage $V_{ref}$ are driven by a driving signal having the same cycle and amplitude as described above, only the amount of charges stored in the finger capacitor $C_f$ may be read regardless of the parasitic capacitance of the parasitic capacitor $C_p$, thereby improving touch performance.

Referring back to FIGS. 1 and 2, the in-cell touch display device according to one embodiment of the present disclosure may generate the modulation voltage having the same cycle and amplitude in the display electrode and the touch electrode.

The organic light emitting diode display panel may have the high potential power voltage $V_{dd}$ and the low potential power voltage $V_{ss}$ that supply a current, a gate voltage (or a scan pulse), a data voltage, etc.

The power supply circuit 200 may generate the high potential power voltage $V_{dd}$ and the low potential power voltage $V_{ss}$ based on the input power VIN and the ground power GND and provide the high potential power voltage $V_{dd}$ and the low potential power voltage $V_{ss}$ to the first RLC circuits $R_{mod1}$, $L_{mod1}$, and $C_{mod1}$ and the second RLC circuits $R_{mod2}$, $L_{mod2}$, and $C_{mod2}$ respectively.

In addition, the power supply circuit 200 may generate the first modulation control voltage $V_{mod1}$ and the second modulation control voltage $V_{mod2}$ used to modulate the high potential power voltage $V_{dd}$ and the low potential power voltage $V_{ss}$ based on the input power VIN and ground power GND and provide the first modulation control voltage $V_{mod1}$ and the second modulation control voltage $V_{mod2}$ to one ends of the first capacitor $C_{mod1}$ of the first RLC circuit and the second capacitor $C_{mod2}$ of the second RLC circuit, respectively.

In addition, during the display period, the power supply circuit 200 may provide the high potential gate driving voltage $V_{gh}$ and the low potential gate driving voltage $V_{gl}$ to the gate driver GDIC and provide the gamma voltage $V_{gamma}$ to the source driver SDIC.

In addition, during the touch period, the power supply circuit 200 may modulate the high potential gate driving voltage $V_{gh}$ and the low potential gate driving voltage $V_{gl}$ into levels having a predetermined cycle and amplitude and provide the modulated high potential gate driving voltage $V_{gh}$ and low potential gate driving voltage Vg to the gate driver GDIC.

In addition, during the touch period, the power supply circuit 200 may provide the touch driving voltage $V_{touch}$ having the predetermined cycle and amplitude to the touch driving circuit ROIC. In addition, the power supply circuit 200 may modulate the gamma voltage $V_{gamma}$ into the level having the predetermined cycle and amplitude and provide the modulated gamma voltage to the source driver SDIC.

The power modulation circuit 400 may modulate the high potential power voltage $V_{dd}$ and the low potential power voltage $V_{ss}$ output from the power supply circuit 200 into the high potential modulation voltage $V_{dd\_mod}$ and the low potential power voltage $V_{ss\_mod}$ using the first RLC circuits $R_{mod1}$, $L_{mod1}$, and $C_{mod1}$ and the second RLC circuits $R_{mod2}$, $L_{mod2}$, and $C_{mod2}$.

During the touch period, the power modulation circuit 400 may modulate the high potential power voltage $V_{dd}$ and the low potential power voltage $V_{ss}$ into the high potential modulation voltage $V_{dd}$ mod and the low potential modulation voltage $V_{ss}$ mod that have the same cycle and amplitude as the touch driving voltage $V_{touch}$ and provide the modulated high potential modulation voltage $V_{dd}$ mod and low potential modulation voltage $V_{ss}$_mw to a plurality of sub-pixels.

In addition, the power modulation circuit 400 may provide the modulated display voltage having the same cycle and amplitude as the touch driving voltage $V_{touch}$ to the gate driver GDIC and the source driver SDIC based on the high potential modulation voltage $V_{dd}$ mod and the low potential modulation voltage $V_{ss\_mod}$.

In addition, the power modulation circuit 400 may provide the modulated reference voltage having the same cycle and amplitude as the touch driving voltage $V_{touch}$ to the touch driving circuit ROIC based on the high potential modulation voltage $V_{dd}$ mod and the low potential modulation voltage $V_{ss}$ mod.

Figure 6A:
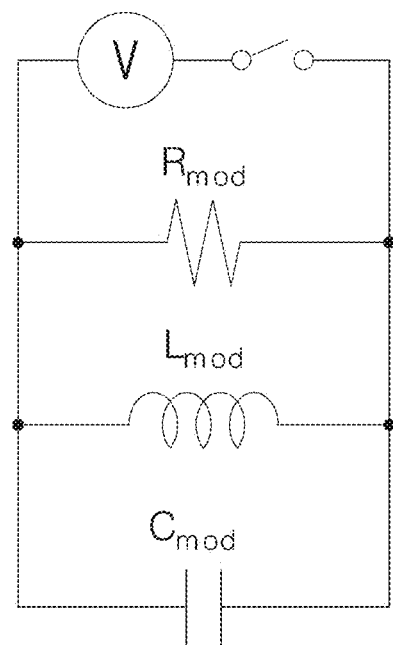
FIGS. 6A and 6B show a parallel RLC circuit and voltage characteristics according to values of $\tau$ and $\omega_d$ according to one or more embodiments of the present disclosure.
Figure 6B:
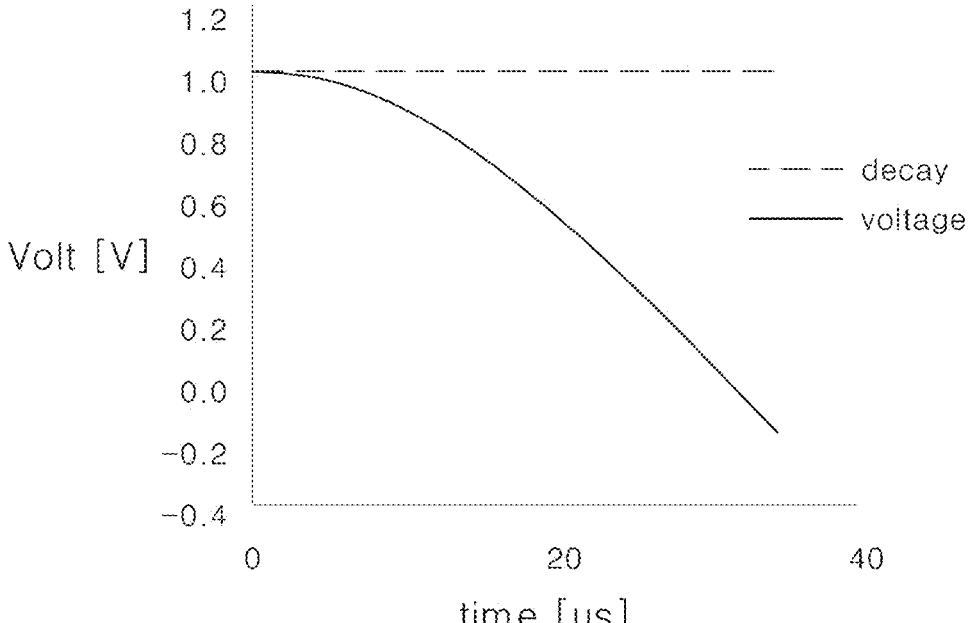
Figure 7A:
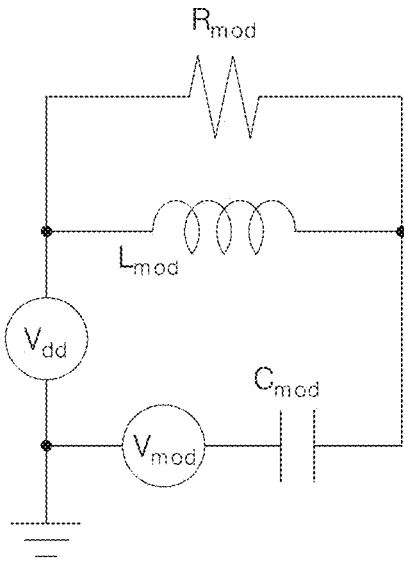
FIGS. 7A and 7B show a parallel RLC circuit to which a modulation voltage is applied and voltage characteristics according to the application of the modulation voltage according to one or more embodiments of the present disclosure.
Figure 7B:
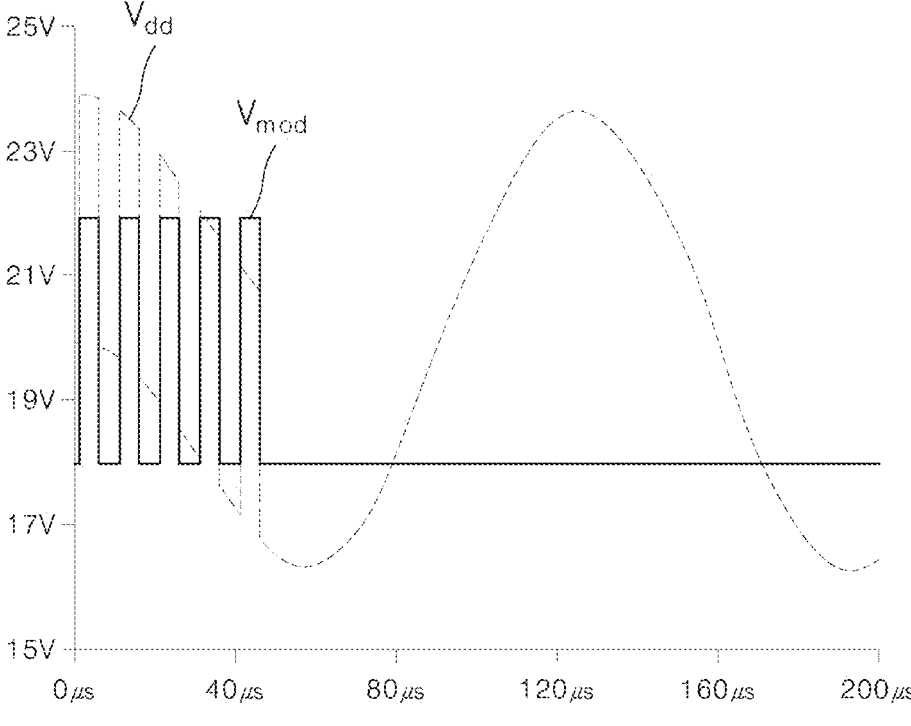

FIGS. 6A and 6B show a parallel RLC circuit and voltage characteristics according to values of $\tau$ and $\omega_d$ according to one or more embodiments of the present disclosure. FIGS. 7A and 7B show a parallel RLC circuit to which a modulation control voltage is applied and voltage characteristics according to the application of the modulation control voltage according to one or more embodiments of the present disclosure.

Referring to FIGS. 6A and 6B, when a switch of the parallel RLC circuit is turned on, a voltage applied to the circuit is shown in Equation 1.

$$V = V_0 \exp(-t/\tau)\sin(\omega_d t) \qquad \text{[Equation 1]}$$

$$\left(\omega_0^2 = \frac{1}{LC}, \sigma = \frac{1}{2\tau} = \frac{R}{2L}, \omega_d^2 = \omega_0^2 - \sigma^2, \tau = RC\right)$$

In this case, voltage characteristics according to values of $\tau=1$ and $\omega_d=50$ kHz are shown in FIG. 6B.

Under the above condition, when five modulation control voltage pulses are applied in the start section as shown in FIG. 7A and FIG. 7B, waveforms shown in FIG. 7B can be obtained. When $\tau$ is great and $\omega_d$ is small, it can be seen that the applied modulation control voltage Vmod is output by being loaded on the high potential power voltage $V_{dd}$.

Figure 8:
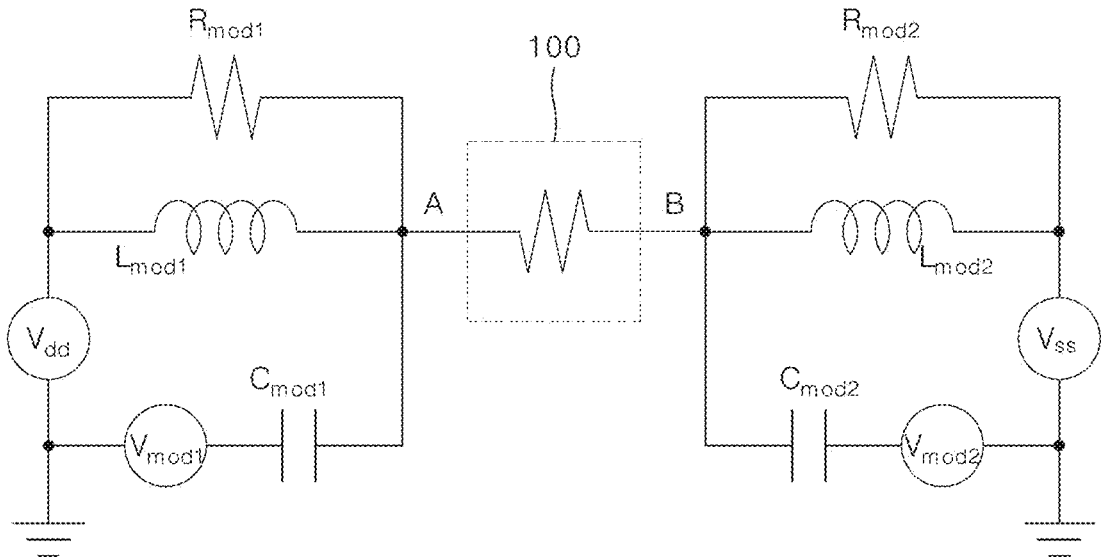
FIG. 8 shows a power modulation circuit to which the in-cell touch display device according to one or more embodiments of the present disclosure is applied.

FIG. 8 shows a power modulation circuit to which the in-cell touch display device is applied according to one or more embodiments of the present disclosure.

Referring to FIG. 8, the high potential power voltage $V_{dd}$ and the low potential power voltage $V_{ss}$ am designed with the resistors $R_{mod1}$ and $R_{mod2}$, the inductors $L_{mod1}$ and $L_{mod2}$, and the capacitors $C_{mod1}$ and $C_{mod2}$ that have the same values, and when the modulation control voltages $V_m$di and $V_{mod2}$ having the same value are applied, a voltage difference between node A and node B may always be kept constant.

That is, the high potential power voltage $V_{dd}$ and the low potential power voltage $V_{ss}$ are applied to a load terminal of the display panel 100, and the flowing current may be kept constant regardless of the modulation control voltages $V_{mod1}$ and $V_{mod2}$.

In addition, when the modulation control voltages $V_{mod1}$ and $V_{mod2}$ are generated and applied based on the high potential power voltage $V_{dd}$ and the low potential power voltage $V_{ss}$, respectively, harmonic components of the high potential modulation voltage $V_{dd\_mod}$ and the low potential modulation voltage $V_{ss\_mod}$ may be greatly reduced.

The in-cell touch display device according to one or more embodiments of the present disclosure may allow the in-cell touch sensor technology to be implemented in the organic light emitting diode display panel without a separate touch electrode.

Figure 9:
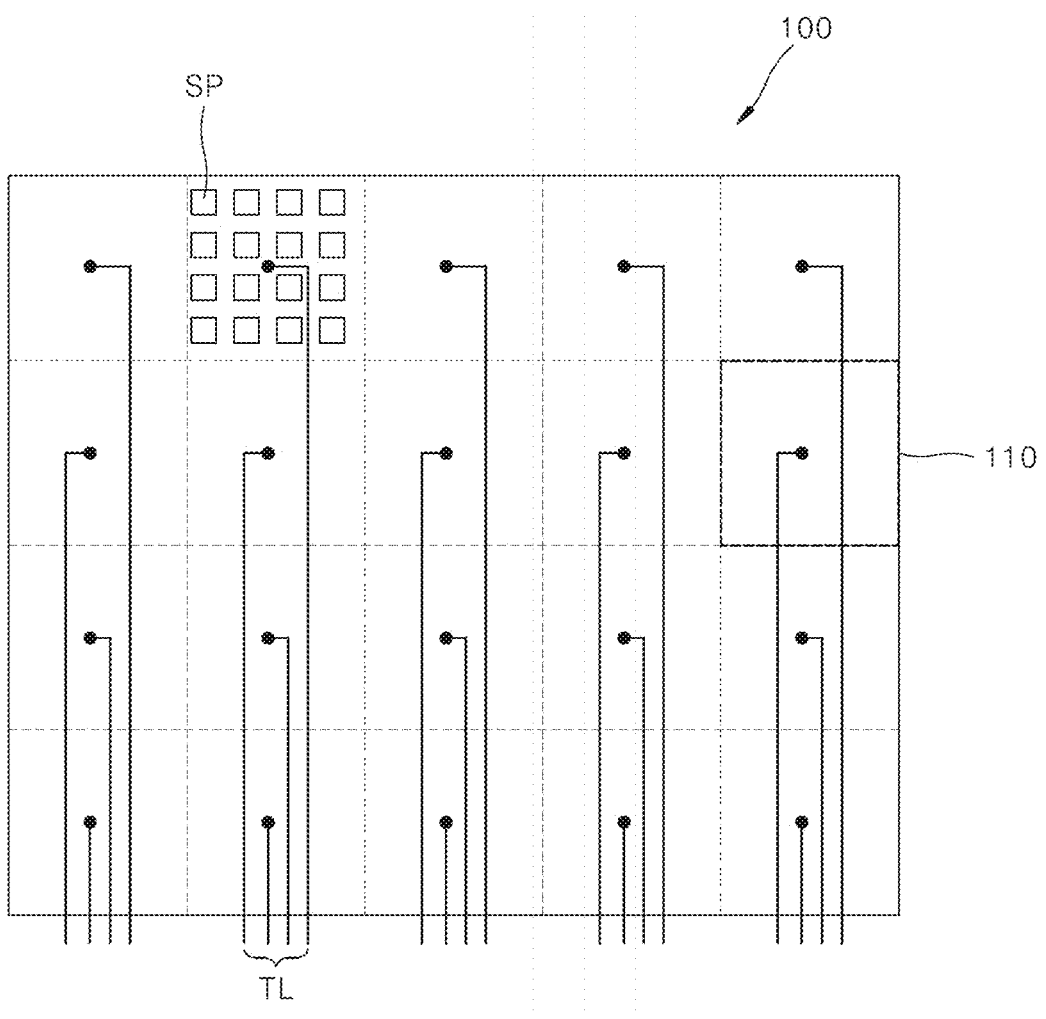
FIG. 9 shows a schematic structure of a touch sensor of the display panel of the in-cell touch display device according to one or more embodiments of the present disclosure.

FIG. 9 shows a schematic structure of a touch sensor of the display panel of the in-cell touch display device according to one or more embodiments of the present disclosure.

Referring to FIG. 9, the display panel 100 may be partitioned into a plurality of areas including a predetermined number of sub-pixels SP. One area may be defined as the touch unit 110.

The cathode electrode CE (see FIG. 10) in the touch unit 110 may be connected to the touch line TL. The touch unit 110 performs a function of a touch sensor without a separate touch electrode. For example, the cathode electrode CE (see FIG. 10) may be formed integrally, and the cathode electrode CE may be partitioned into areas of the plurality of touch units 110 by the touch line TL. For example, a nearby area including a portion connected to one touch line TL may be defined/understood as one touch unit 110 (e.g., a virtual touch unit) in touch driving/sensing. In addition, the touch unit 110 may be an area including a plurality of sub-pixels SP.

Figure 11:
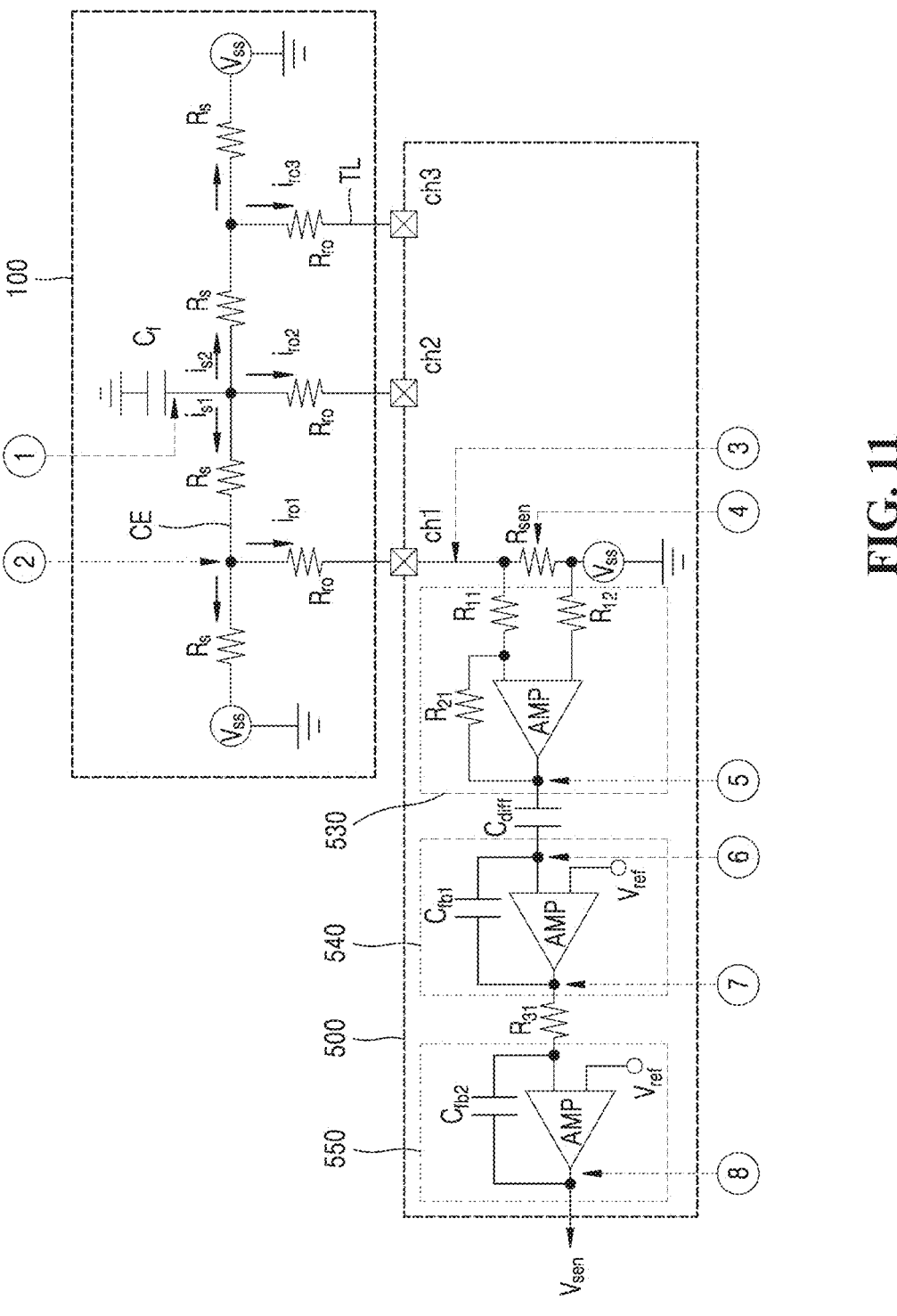
FIG. 11 shows a sensing circuit in the in-cell touch display device according to one or more embodiment of the present disclosure.

The touch line TL may be connected to an external sensing circuit 500 (see FIG. 11).

When the backplane of the thin film transistor is manufactured, the touch line TL may be formed, and when the cathode electrode CE is deposited after an organic material is deposited, the touch line TL and the cathode electrode CE may be connected. For example, the touch line TL may be connected to the cathode electrode CE after vaporizing the organic material using a reverse-tapered structure or using a laser.

Figure 10:
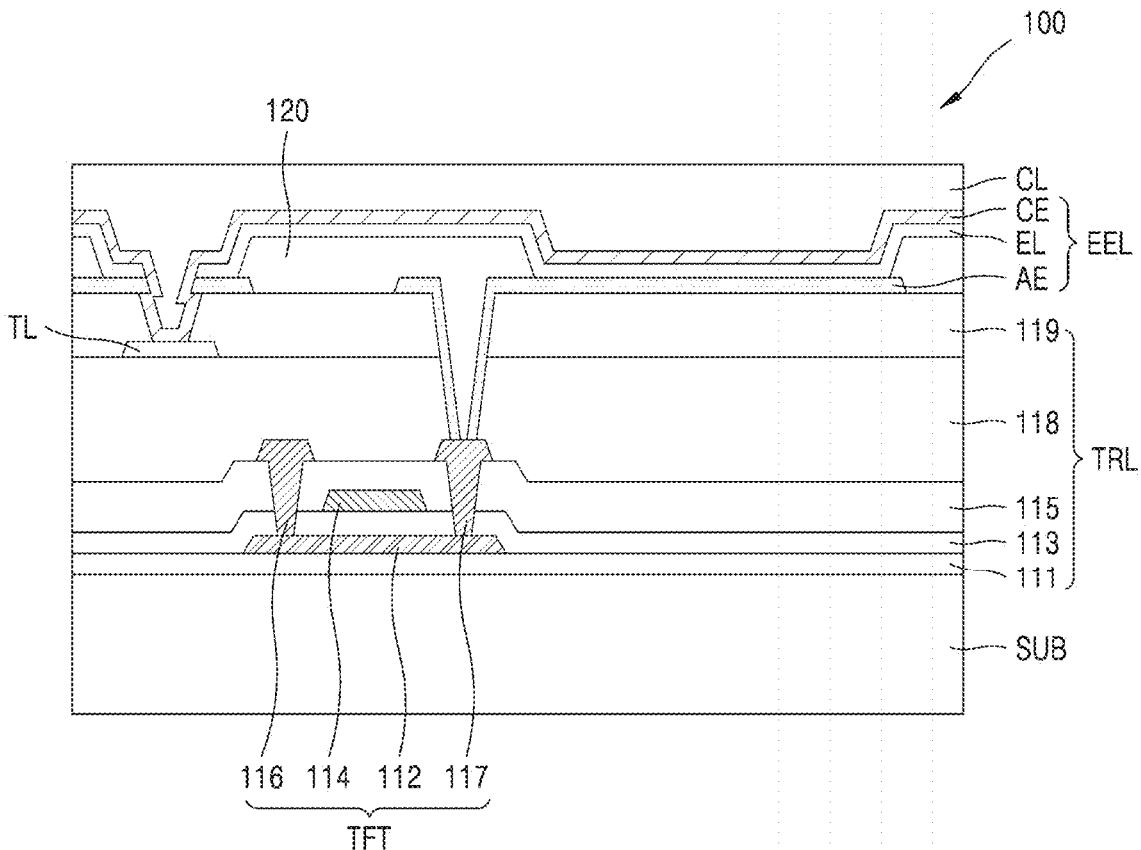
FIG. 10 shows a cross-sectional view of the display panel of the in-cell touch display device according to one or more embodiments of the present disclosure.

FIG. 10 shows a cross-sectional view of the display panel of the in-cell touch display device according to one or more embodiments of the present disclosure.

The display panel 100 of the in-cell touch display device according to one or more embodiments of the present disclosure may include a substrate SUB, a transistor formation layer TRL on which the thin film transistor TFT is formed, a light emitting element layer EEL, and a cover layer CL.

The transistor formation layer TRL may be formed on the substrate SUB. The touch line TL connected to the cathode electrode CE of the light emitting element layer EEL may be formed in the transistor formation layer TRL.

The light emitting element layer EEL may be formed on the transistor formation layer TRL. The light emitting element layer EEL may include the anode electrode AE, the emission layer EL, and the cathode electrode CE. The anode electrode AE may be formed on the transistor formation layer TRL at a predetermined interval. The emission layer EL may be formed between the anode electrode AE and the cathode electrode CE. The emission layer EL may be made of an organic material. The cathode electrode CE may be formed on the emission layer EL.

The cover layer CL may be formed on the light emitting element layer EEL. The cover layer CL may be made of a transparent material. When a touch target touches the cover layer CL, an object capacitor Cf (see FIG. 11) may be formed between the touch target and the cathode electrode.

The transistor formation layer TRL will be described in more detail as follows.

The buffer layer 111 may be formed on the substrate SUB. The buffer layer 111 may be made of an insulating material. The semiconductor 112 of the thin film transistor TFT may be formed on the buffer layer 111.

The gate insulating layer 113 may be formed on the semiconductor 112 and the buffer layer 111. The gate electrode 114 may be formed at the location overlapping the semiconductor 112 on the gate insulating layer 113.

The interlayer insulating layer 115 may be formed on the gate electrode 114 and the gate insulating layer 113. The source electrode 116 and the drain electrode 117 may be formed on the interlayer insulating layer 115. The source electrode 116 and the drain electrode 117 may be electrically connected to the semiconductor 112 through contact holes.

A first planarization layer 118 may be formed on the source electrode 116, the drain electrode 117, and the interlayer insulating layer 115. A second planarization layer 119 may be formed on the first planarization layer 118.

The touch line TL may be formed on the second planarization layer 119. The second planarization layer 119 may include an organic insulating material.

The touch line TL may be formed at a location that does not overlap the semiconductor 112, the source electrode 116, the drain electrode 117, and the gate electrode 114 in the transistor formation layer TRL.

The light emitting element layer EEL will be described in more detail as follows.

The anode electrode AE of the light emitting element layer EEL may be formed on the second planarization layer 119. A portion of the second planarization layer 119 may be in direct contact with a portion of an upper surface of the touch line TL. The anode electrode AE may be electrically connected to the drain electrode 117 of the thin film transistor TFT through the pixel contact hole.

The emission layer EL of the light emitting element layer EEL may be made of an organic material on the anode electrode AE.

The cathode electrode CE of the light emitting element layer EEL may be formed on the emission layer EL. A portion of the cathode electrode CE may be in direct contact with a side surface of the second planarization layer 119.

In addition, the bank layer 120 may be formed on a portion of the second planarization layer 119 and a portion of the anode electrode AE. The bank layer 120 may be made of an opaque material to prevent light interference between pixels adjacent to each other. For example, the bank layer 120 may include an opaque organic material.

In addition, the touch contact hole may be formed in the bank layer 120, and the touch contact hole may pass through a portion of the emission layer EL that overlaps the touch line TL, a metal layer that overlaps the touch line TL, is spaced apart from the anode electrode AE and made of a same material as the anode electrode AE, and the second planarization layer 119. A portion of the cathode electrode CE may be in direct contact with a side surface of a portion of the metal layer that overlaps the touch line TL. The touch line TL may be electrically connected to the cathode electrode CE through a touch contact hole. FIG. 10 shows that the touch contact hole passes through the metal layer and the emission layer EL, but it is illustrative, and a location of the touch contact hole is not limited thereto. For example, a touch contact hole may be formed to pass through the bank layer 120 in a portion in which at least one of the anode electrode AE and the emission layer EL is not disposed, and the cathode electrode CE and the touch line TL may be electrically connected through the touch contact hole.

The low potential modulation voltage $V_{ss\_mod}$ having the predetermined cycle and amplitude may be applied to at least one of the cathode electrode CE and the touch line TL during the touch period.

FIG. 11 shows a sensing circuit in the in-cell touch display device according to one or more embodiments of the present disclosure.

Referring to FIG. 11, the in-cell touch display device according to the present disclosure may include the display panel 100 and the sensing circuit 500.

The display panel 100 may include a plurality of sub-pixels having a light emitting element and a thin film transistor. The display panel 100 may include the cathode electrode CE of the light emitting element and the touch line TL. Here, the touch line TL may be formed on the transistor formation layer TRL, and the touch line TL may be connected to the cathode electrode CE of the light emitting element.

The cathode electrode CE may be formed integrally and partitioned into the areas of the plurality of touch units 110 (see FIG. 9) by the touch line TL. The cathode electrode CE may have a sheet resistor Rs, and the touch line TL may have an internal resistor $R_{ro}$.

During the touch period, the low potential power voltage $V_{ss}$ may be applied to the cathode electrode CE and the touch line TL as the low potential modulation voltage $V_{ss\_mod}$ (see FIGS. 1 and 2) having the predetermined cycle and amplitude.

When an object touches the display panel 100, the object capacitor $C_f$ may be formed between the object and the cathode electrode CE, and touch currents $i_{s1}$ and $i_{s2}$ formed in the object capacitor $C_f$ may be output to a plurality of touch lines TL through the sheet resistor $R_s$ of the cathode electrode CE.

For example, a first touch line may be connected to a first output pad ch1, a second touch line may be connected to a second output pad ch2, and a third touch line may be connected to a third output pad ch3. Here, the first output pad ch1, the second output pad ch2, and the third output pad ch3 may be connected to the sensing circuit 500.

The touch currents $i_{s1}$ and $i_{s2}$ flowing through the sheet resistor $R_s$ of the cathode electrode CE may be output to the plurality of touch lines TL, and touch currents $i_{ro1}$, $i_{ro2}$, and $i_{ro3}$ flowing through the internal resistor $R_{ro}$ of the plurality of touch lines TL may be output to the sensing circuit 500 through the corresponding output pads.

According to touch locations, values of the touch currents $i_{ro1}$, $i_{ro2}$, and $i_{ro3}$ flowing through the plurality of touch lines TL may be changed by the sheet resistor Rs of the cathode electrode CE.

For example, as shown in FIG. 11, since the resistance value of the sheet resistor $R_s$ of the cathode electrode CE increases as the sheet resistor $R_s$ is far from the touch location (object capacitor), the value of the touch current flowing through the touch line far from the touch location may gradually decrease. As a result, the second touch current $i_{ro2}$ flowing through the touch line close to the touch location may have a greater value than the first touch current $i_{ro1}$ and the third touch current $i_{ro3}$ flowing through the adjacent touch line. The sensing circuit 500 may sense the touch current flowing through the plurality of touch lines and detect the touch location through the intensity of the touch current. For example, location coordinates of the plurality of touch lines may be set in advance, and the touch location may be determined through the location coordinates of the corresponding touch line in which a current has a great intensity among the plurality of touch lines.

Detailed configuration of the sensing circuit 500 will be described as follows.

The sensing circuit 500 may output a touch sensing signal Vsen by amplifying the signal flowing through the touch line TL, differentiating the amplified signal, primarily integrating the differentiated signal, and secondarily integrating the integrated signal.

The sensing circuit 500 may provide the touch sensing signal Vsen to an analog-to-digital converter (not shown), and the analog-to-digital converter may convert the touch sensing signal Vsen into touch sensing data DA_sen, which is a digital signal. The sensing circuit 500 and the analog-to-digital converter may be included in the touch driving circuit ROIC. The touch driving circuit ROIC may provide the touch sensing data DA_sen corresponding to the touch sensing signal Vsen to the controller 300 (see FIG. 1).

The sensing circuit 500 may include a sensing resistor $R_{sen}$, an amplifier 530 (e.g., amplifier circuit 530), a differential capacitor $C_{diff}$, a first integrator 540 (e.g., first integrator circuit 540), and a second integrator 550 (e.g., second integrator circuit 550).

The sensing resistor $R_{sen}$ has one end connected to the touch line TL and the other end connected to a supply terminal of the low potential power voltage $V_{ss}$.

The sensing resistor $R_{sen}$ has a function of converting a current signal flowing through the touch line TL into a voltage signal. Here, during the touch period, the low potential modulation voltage $V_{ss}$ mod having the predetermined cycle and amplitude may be applied to the other end of the sensing resistor $R_{sen}$ through the supply terminal of the low potential power voltage.

The amplifier 530 may amplify a voltage corresponding to a difference between voltages applied to both ends of the sensing resistor $R_{sen}$ and output the amplified voltage.

The amplifier 530 may include a first input resistor R having one end connected to one end of the sensing resistor $R_{sen}$, and a second input resistor $R_{12}$ having one end connected to the other end of the sensing resistor $R_{sen}$. In addition, the amplifier 530 may include an operational amplifier AMP (e.g., operational amplifier circuit) having a first input terminal connected to the other end of the first input resistor $R_{11}$ and a second input terminal connected to the other end of the second input resistor $R_{12}$, and a feedback resistor $R_{21}$ connected between the first input terminal and an output terminal of the operational amplifier AMP.

The differential capacitor $C_{diff}$ has one end connected to the output terminal of the amplifier 530 and the other end connected to the first integrator 540.

The differential capacitor $C_{diff}$ differentiates a signal amplified by the amplifier 530 and outputs the differentiated signal. The differential capacitor C has a function of reducing a deviation of the touch signal due to a difference in resistance values of the touch lines TL for each channel of the display panel 100.

The first integrator 540 primarily integrates an output signal of the differential capacitor $C_{diff}$.

The first integrator 540 may include the operational amplifier AMP having the first input terminal receiving the signal output through the differential capacitor C and the second input terminal to which the reference voltage $V_{ref}$ is applied, and a first feedback capacitor $C_{diff}$ connected between the first input terminal and the output terminal of the operational amplifier AMP.

The second integrator 550 secondarily integrates an output signal of the first integrator 540.

The second integrator 550 may include the operational amplifier AMP having the first input terminal receiving the output signal of the first integrator 540 and the second input terminal to which the reference voltage Vref is applied, and a second feedback capacitor $C_{fb2}$ connected between the first input terminal and the output terminal of the operational amplifier AMP.

A transfer resistor $R_{31}$ may be further connected between an output terminal of the first integrator 540 and a first input terminal of the second integrator 550.

In addition, according to another embodiment of the present disclosure, although not shown in FIG. 11, a switch circuit instead of the transfer resistor $R_{31}$ may be connected between the output terminal of the first integrator 540 and the first input terminal of the second integrator 550. The switch circuit may transmit a signal rising from a low level to a high level or a signal falling from a high level to a low level output from the first integrator 540 to the second integrator 550.

The second integrator 550 may integrate the signal rising from the low level to the high level and output the integrated signal as the touch sensing signal $V_{sen}$, or integrate the signal falling from the high level to the low level and output the integrated signal as the touch sensing signal $V_{sen}$.

During the touch period, the low potential modulation voltage $V_{sen}$ having the predetermined cycle and amplitude may be applied to the cathode electrode CE and the touch line TL of the display panel 100 and the sensing resistor $R_{sen}$ of the sensing circuit 500. In addition, a modulated reference voltage $V_{ref\_mod}$ having the same cycle and amplitude as the low potential modulation voltage $V_{ss\_mod}$ may be applied to the first integrator 540 and the second integrator 550.

The in-cell touch display device according to the present disclosure applies the low potential power voltage $V_{ss}$ to the touch line TL and supplies the low potential power voltage $V_{ss}$ to the cathode electrode CE during the display period.

The in-cell touch display device of the present disclosure drives the modulated display voltages $V_{dd\_mod}$, $V_{ss\_mod}$, $V_{gamma\_mod}$, $V_{gh\_mod}$, $V_{gl\_mod}$, etc. and the modulated reference voltage $V_{ref\_mod}$ having the predetermined cycle and amplitude during the touch period. At this time, the touch currents $i_{s1}$, $i_{s2}$, $i_{ro1}$, $i_{ro2}$, and $i_{ro3}$ generated from the object capacitor $C_f$ by the modulated signal are output to the sensing circuit 500 through the cathode electrode CE and the touch line TL.

Since the values of the touch currents $i_{ro1}$, $i_{ro2}$, and $i_{ro3}$ flowing through the plurality of touch lines TL according to the touch locations may be changed according to the sheet resistor $R_s$ of the cathode electrode CE, the touch locations may be determined by using the values.

For example, since the touch line close to the touch location has a smaller resistance value of the sheet resistor $R_s$ of the cathode electrode CE, the touch current greater than touch currents flowing through other adjacent touch lines flows through the same. Therefore, touch coordinates may be detected through location coordinates of the touch line having a greater value of the touch current among the plurality of touch lines.

Since the sensing circuit 500 is composed of the low potential power voltage $V_{ss}$, the sensing resistor $R_{sen}$ having a constant resistance value, and the amplifier 530, when the touch currents $i_{s1}$, $i_{s2}$, $i_{ro1}$, $i_{ro2}$, and $i_{ro3}$ flow upon touch of the object, a voltage difference between both ends of the sensing resistor $R_{sen}$ is changed, and the voltage difference is sensed by being amplified by the amplifier 530. Since a base current flowing through the sensing resistor $R_{sen}$ due to the IR drop of the touch currents $i_{ro1}$, $i_{ro2}$, and $i_{ro3}$ caused by the internal resistor $R_{ro}$ of each touch line TL differs for each location at which the touch line TL is connected, the base current differs at each location. Here, the base current may be defined as the current flowing through the touch line TL before touch.

To solve such a problem, the touch signal may be detected by differentiating the output signal of the amplifier 530 through the differential capacitor $C_{diff}$ and integrating the differentiated signal through the first integrator 540 and the second integrator 550, and the detected touch signal may be converted into the touch sensing signal $V_{sen}$ and output.

Figure 12:
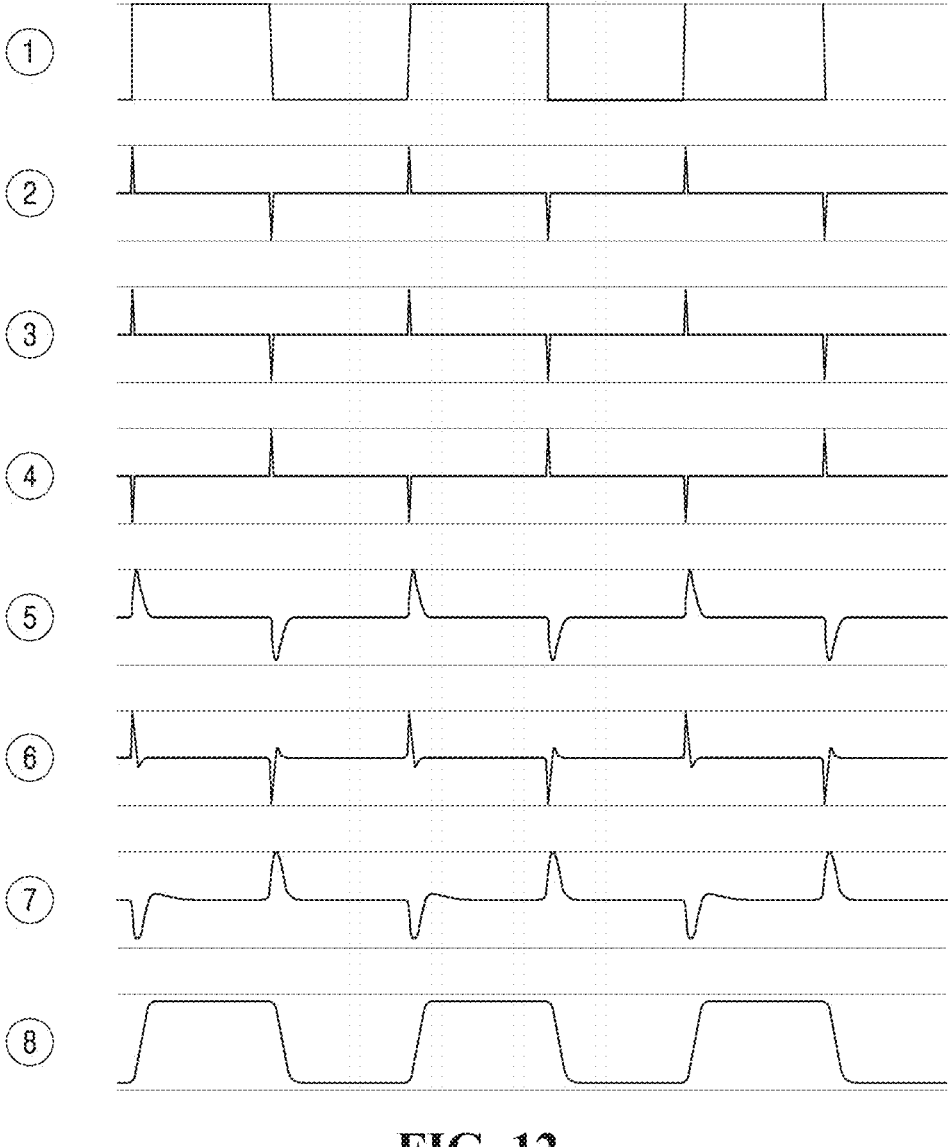
FIG. 12 shows a driving timing diagram in the in-cell touch display device according to one or more embodiments of the present disclosure.

FIG. 12 shows a driving timing diagram in the in-cell touch display device according to one or more embodiments of the present disclosure.

In the driving simulation, it is assumed that the low potential modulation voltage $V_{ss\_mod}$ having the predetermined cycle and amplitude is applied to at least one of the touch line TL and the cathode electrode CE and thus the voltage of the object FIN is modulated based on the display panel.

Here, ① shows a signal in which the low potential modulation voltage $V_{ss\_mod}$ having the predetermined cycle and amplitude is applied to the touch line TL and the cathode electrode CE during the touch period.

② shows a signal at the cathode electrode CE by the low potential modulation voltage $V_{ss\_mod}$. ③ shows a signal input to the amplifier 530 through the internal resistor $R_{ro}$ of the touch line TL.

④ shows a current flowing through the sensing resistor $R_{sen}$. The current of the sensing resistor $R_{sen}$ may be changed when the object touches the display panel 100. ⑤ shows the amplified signal output from the amplifier 530.

⑥ shows a signal obtained by differentiating the amplified signal ⑤ using the differential capacitor $C_{diff}$. ⑦ shows a signal obtained by primarily integrating the differentiated signal ⑥ through the first integrator 540.

⑧ shows a signal obtained by secondarily integrating the primary integration signal ⑦ through the second integrator 550. The signal of ⑧ output from the second integrator 550 may be a signal restoring ①.

Figure 13:
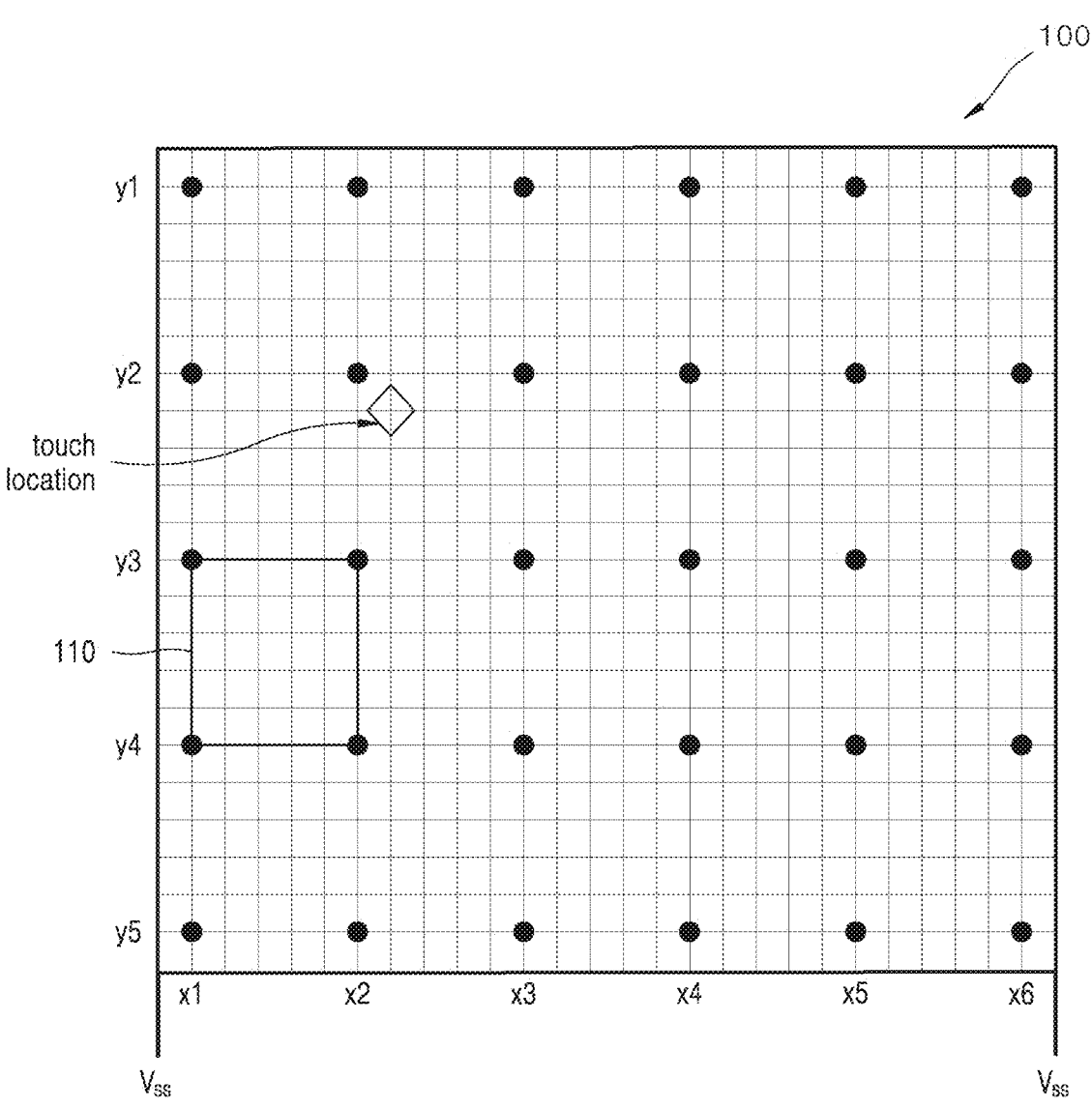
FIG. 13 shows the display panel of the in-cell touch display device according to one or more embodiments of the present disclosure.
Figures 14, 15:
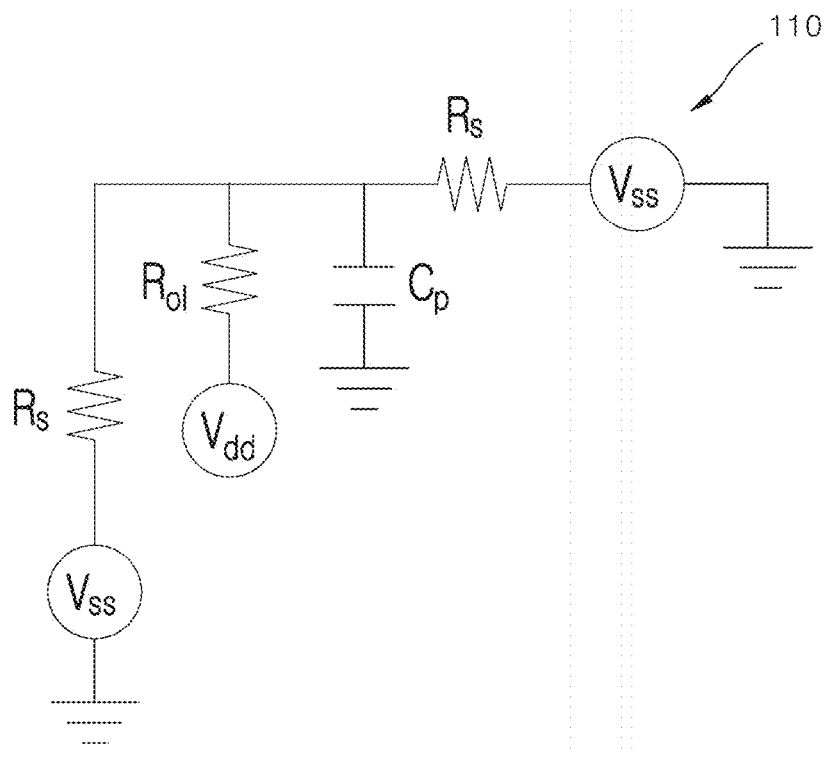
FIG. 14 shows an equivalent circuit diagram of a touch unit of FIG. 13 according to one or more embodiments of the present disclosure.
FIG. 15 shows an output value of a touch line according to a touch location of FIG. 13 according to one or more embodiments of the present disclosure.

FIG. 13 shows the display panel of the in-cell touch display device according to one or more embodiments of the present disclosure. FIG. 14 shows an equivalent circuit diagram of a touch unit of FIG. 13 according to one or more embodiments of the present disclosure. FIG. 15 shows an output value of a touch line according to a touch location of FIG. 13 according to one or more embodiments of the present disclosure.

Simulation was performed through the display panel 100 configured as shown in FIG. 13 to check operational characteristics. First, the touch unit 110 had a resistor Rol disposed between the sheet resistor $R_s$ and the parasitic capacitor $C_p$ and between the sheet resistor $R_s$ to which the low potential power voltage $V_{ss}$ is supplied and the high potential power voltage $V_{dd}$. Here, the resistor $R_{ol}$ serves as a serial resistor of the driving thin film transistor and the light emitting element.

The touch unit 110 was composed of a 5×5 pixel unit, and the display panel 100 was composed of a 4×5 touch unit 110. The low potential power voltage $V_{ss}$ was supplied through a low potential power voltage line outside the touch panel 100.

Magnitudes of the resistor $R_{ol}$ and the parasitic capacitor $C_p$ were set to be equivalent to values of 20 touch units 110 in the display panel.

For example, the results obtained for one pulse under the conditions that the sheet resistance was 87 Ω/sh, the touch line resistance was 500Ω, the object capacitor $C_f$ was 1 pf, and the modulation control voltage $V_{mod}$ was 10 V are shown in FIG. 15. Touch locations may be obtained by outputting the low potential modulation voltage $V_{ss\_mod}$ applied by the pulse of the modulation control voltage from three and four areas of the touch line TL without widely spreading to the sheet resistor of the display panel.

Figure 16:
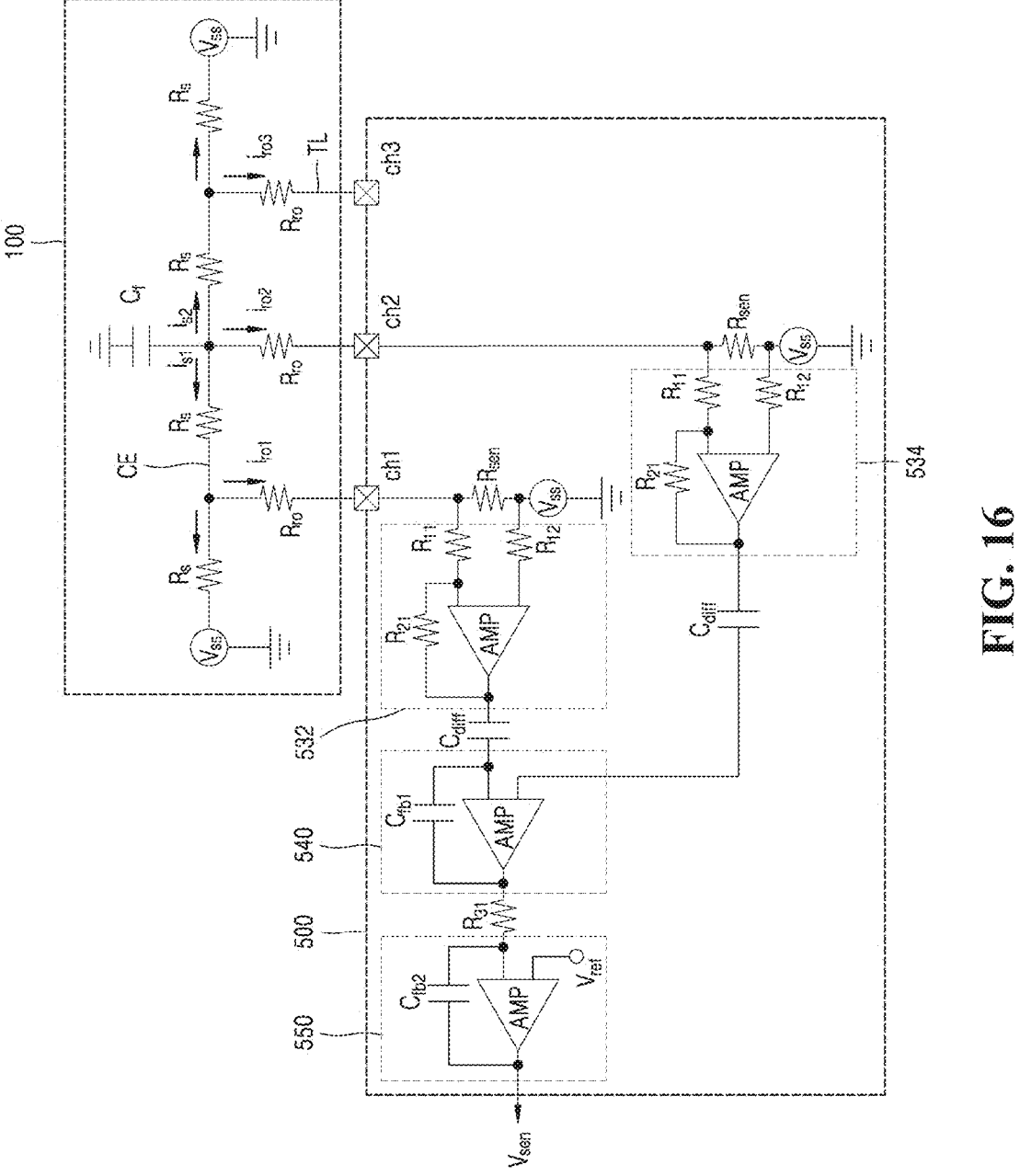
FIG. 16 shows a sensing circuit in the in-cell touch display device according to one or more other embodiments of the present disclosure.

FIG. 16 shows a sensing circuit in the in-cell touch display device according to one or more other embodiments of the present disclosure.

Referring to FIG. 16, the sensing circuit 500 may include the first sensing resistor $R_{sen}$ having one end connected to the first touch line and the other end connected to a supply terminal of the low potential power voltage $V_{ss}$, a first amplifier 532 for amplifying a voltage corresponding to a difference between voltages applied to both ends of the first sensing resistor $R_{sen}$ and outputting the amplified voltage, the second sensing resistor $R_{sen}$ having one end connected to the second touch line and the other end connected to a supply terminal of the low potential power voltage $V_{ss}$, and a second amplifier 534 for amplifying a voltage corresponding to a difference between voltages applied to both ends of the second sensing resistor $R_{sen}$ and outputting the amplified voltage.

Here, the first touch line and the second touch line may be defined as lines connected to the adjacent touch unit 110. For example, the first touch line may be connected to the first touch unit, and the second touch line may be connected to a second touch unit adjacent to the first touch unit.

In addition, the sensing circuit 500 may include the first differential capacitor $C_{diff}$ having one end connected to an outer terminal of the first amplifier 532 and the other end connected to an input terminal of the first integrator 540, the second differential capacitor $C_{diff}$ having one end connected to an output terminal of the second amplifier 534 and the other end connected to an input terminal of the reference voltage of the first integrator 540, the first integrator 540 for receiving a first output signal of the first differential capacitor $C_{diff}$ and a second output signal of the second differential capacitor $C_{diff}$ and primarily integrating the first and second output signals, and the second integrator 550 for receiving the output signal of the first integrator 540 and the reference voltage $V_{ref}$ and secondarily integrating the output signal and the reference voltage $V_{ref}$.

According to the embodiments of the present disclosure, it is possible to implement the touch function in the display panel in the minimum process.

In addition, the low potential power voltage can be supplied to the touch line, thereby reducing internal resistance.

In addition, it is possible to reduce the thickness of the display panel compared to the add-on touch and reduce the size of the bezel.

In addition, since the touch electrode is not present on the organic light emitting diode, it is possible to increase transmittance compared to the conventional touch technology.

In addition, since the touch line serves as the touch electrode, it is possible to enable the top and bottom emission of the organic light emitting diode.

In addition, since the touch line serves as the touch electrode, it is possible to enable double-sided touch.

In addition, it is possible to implement process optimization by reducing the touch cost and the production energy.

In addition, since the large parasitic capacitance between the touch electrode and the display electrode does not need to be filled, it is possible to reduce the consumed power, thereby implementing low power.

An in-cell touch display device according to one or more embodiments of the present disclosure may include a substrate, a transistor formation layer formed on the substrate and including a semiconductor, a source electrode, a drain electrode, and a gate electrode, and a light emitting element layer formed on the transistor formation layer and including an anode electrode, an emission layer, a cathode electrode, and a bank layer, wherein a plurality of touch lines may be formed in the transistor formation layer, and the cathode electrode may be electrically connected to the plurality of touch lines.

According to one or more embodiments of the present disclosure, the touch line may be formed at a location not overlapping the semiconductor, the source electrode, the drain electrode, and the gate electrode in the transistor formation layer.

According to one or more embodiments of the present disclosure, the cathode electrode may be formed integrally.

According to one or more embodiments of the present disclosure, the touch line may be formed on a planarization layer located on the semiconductor, the source electrode, the drain electrode, and the gate electrode in the transistor formation layer.

According to one or more embodiments of the present disclosure, a contact hole may be formed in at least one of the bank layer, the emission layer, and the anode electrode that overlap the touch line, and the cathode electrode may be electrically connected to the touch line through the contact hole.

According to one or more embodiments of the present disclosure, during a touch period, a low potential modulation voltage having a predetermined cycle and amplitude may be applied to at least one of the cathode electrode and the touch line.

According to one or more embodiments of the present disclosure, the in-cell touch display device may further include a sensing circuit configured to detect a touch signal by amplifying a signal of the touch line, differentiating the amplified signal, and primarily and secondarily integrating the differentiated signal.

According to one or more embodiments of the present disclosure, the sensing circuit may include a sensing resistor having one end connected to the touch line and the other end connected to a supply terminal of a low potential power voltage, an amplifier configured to amplify a voltage corresponding to a difference between voltages applied to both ends of the sensing resistor, a differential capacitor having one end connected to an output terminal of the amplifier and the other end connected to a first integrator, the first integrator configured to primarily integrate an output signal of the differential capacitor, and a second integrator configured to secondarily integrate an output signal of the first integrator.

According to one or more embodiments of the present disclosure, during a touch period, a low potential modulation voltage having a predetermined cycle and amplitude may be applied to the cathode electrode and the touch line, and a reference voltage having the same cycle and amplitude as the low potential modulation voltage may be applied to the first integrator and the second integrator.

An in-cell touch display device according to one or more other embodiments of the present disclosure may include a display panel including a plurality of sub-pixels having a light emitting element and a thin film transistor, having a touch line formed on a backplane of the thin film transistor, and having a cathode electrode of the light emitting element connected to the touch line, and a sensing circuit configured to sense a touch signal by amplifying a signal flowing through the touch line, differentiating the amplified signal, primarily integrating the differentiated signal, and secondarily integrating the integrated signal.

According to one or more other embodiments of the present disclosure, the plurality of sub-pixels may be partitioned into a plurality of areas, one area including a predetermined number of sub-pixels is defined as a touch unit, and cathode electrodes of the sub-pixels in the touch unit may be connected to one touch line.

According to one or more other embodiments of the present disclosure, the cathode electrode may be formed integrally.

According to one or more other embodiments of the present disclosure, the sensing circuit may include a sensing resistor having one end connected to the touch line and the other end connected to a supply terminal of a low potential power voltage, an amplifier configured to amplify a voltage corresponding to a difference between voltages applied to both ends of the sensing resistor and output the amplified voltage, a differential capacitor having one end connected to an output terminal of the amplifier and the other end connected to a first integrator, a first integrator configured to primarily integrate an output signal of the differential capacitor, and a second integrator configured to secondarily integrate an output signal of the first integrator.

According to one or more other embodiments of the present disclosure, during a touch period, a low potential modulation voltage having a predetermined cycle and amplitude may be applied to the other end of the sensing resistor through a supply terminal of the low potential power voltage.

According to one or more other embodiments of the present disclosure, the amplifier may include a first input resistor having one end connected to one end of the sensing resistor, a second input resistor having one end connected to the other end of the sensing resistor, a first operational amplifier having a first input terminal connected to the other end of the first input resistor and a second input terminal connected to the other end of the second input resistor, and a feedback resistor connected between the first input terminal and an outer terminal of the first operational amplifier.

According to one or more other embodiments of the present disclosure, the first integrator may include a second operational amplifier having a third input terminal configured to receive a signal output through the differential capacitor and a fourth input terminal to which a reference voltage is applied, and a first feedback capacitor connected between the third input terminal and an outer terminal of the second operational amplifier According to one or more other embodiments of the present disclosure, the second integrator may include a third operational amplifier having a fifth input terminal configured to receive an output signal of the first integrator and a sixth input terminal to which the reference voltage is applied, and a second feedback capacitor connected between the fifth input terminal and an outer terminal of the third operational amplifier.

According to one or more other embodiments of the present disclosure, the in-cell touch display device may further include a transfer resistor connected between an output terminal of the first integrator and the fifth input terminal of the second integrator.

According to one or more other embodiments of the present disclosure, the in-cell touch display device may further include a switch circuit provided between the output terminal of the first integrator and the fifth input terminal of the second integrator to transmit a signal rising from a low level to a high level or transmit a signal falling from a high level to a low level to the second integrator.

According to one or more other embodiments of the present disclosure, during a touch period, a low potential modulation voltage having a predetermined cycle and amplitude may be applied to the cathode electrode and the touch line, and a reference voltage having the same cycle and amplitude as the low potential modulation voltage may be applied to the first integrator and the second integrator.

According to one or more other embodiments of the present disclosure, the sensing circuit may include a first sensing resistor having one end connected to a first touch line and the other end connected to a supply terminal of a low potential power voltage, a first amplifier configured to amplify a voltage corresponding to a difference between voltages applied to both ends of the first sensing resistor and output the amplified voltage, a second sensing resistor having one end connected to a second touch line and the other end connected to the supply terminal of the low potential power voltage, a second amplifier configured to amplify a voltage corresponding to a difference between voltages applied to both ends of the second sensing resistor and output the amplified voltage, a first differential capacitor having one end connected to an output terminal of the first amplifier and the other end connected to an input terminal of a first integrator, a second differential capacitor having one end connected to an output terminal of the second amplifier and the other end connected to an input terminal of a reference voltage of the first integrator, the first integrator configured to receive a first output signal of the first differential capacitor and a second output signal of the second differential capacitor and primarily integrating the first and second output signals, and a second integrator configured to receive the output signal of the first integrator and the reference voltage and secondarily integrate the output signal of the first integrator and the reference voltage.

According to one or more other embodiments of the present disclosure, the plurality of sub-pixels may be partitioned into a plurality of areas, one area including a predetermined number of sub-pixels may be defined as a touch unit, and a first touch line and a second touch line may be defined as lines connected to adjacent touch units.

An in-cell touch display device according to one or more another embodiments of the present disclosure may include a substrate; an insulating layer on the substrate; a thin film transistor including a semiconductor on the insulating layer, a gate electrode, a source electrode connected to the semiconductor, and a drain electrode connected to the semiconductor; a first planarization layer on the source electrode and the drain electrode; a touch line on the first planarization layer, the touch line non-overlapping with the thin film transistor; a second planarization layer on the first planarization layer and the touch line; and a light emitting element on the second planarization layer, the light emitting element including an anode electrode that is connected to the drain electrode, an emission layer on the anode electrode, and a cathode electrode on the emission layer that is connected to the touch line.

According to one or more another embodiments of the present disclosure, the touch line is non-overlapping with the semiconductor, the source electrode, the drain electrode, and the gate electrode.

According to one or more another embodiments of the present disclosure, the cathode electrode is connected to the touch line through a hole that passes through the emission layer, a metal layer that is made of a same material as the anode electrode and spaced apart from the anode electrode, and the second planarization layer.

According to one or more another embodiments of the present disclosure, a portion of the cathode electrode is in direct contact with a side surface of a portion of the metal layer that overlaps the touch line.

According to one or more another embodiments of the present disclosure, a portion of the cathode electrode is in direct contact with a side surface of the second planarization layer.

According to one or more another embodiments of the present disclosure, a portion of the second planarization layer is in direct contact with a portion of an upper surface of the touch line.

According to the embodiments of the present disclosure, it is possible to implement the touch function in the display panel in the minimum or at least reduced process.

In addition, the low potential power voltage can be supplied to the touch line, thereby reducing internal resistance.

In addition, it is possible to reduce the thickness of the display panel compared to the add-on touch and reduce the size of the bezel.

In addition, since the touch electrode is not present on the organic light emitting diode, it is possible to increase transmittance compared to the conventional touch technology.

In addition, since the touch line serves as the touch electrode, it is possible to enable the top and bottom emission of the organic light emitting diode.

In addition, since the touch line serves as the touch electrode, it is possible to enable double-sided touch.

In addition, it is possible to implement process optimization by reducing the touch cost and the production energy.

In addition, since the large parasitic capacitance between the touch electrode and the display electrode does not need to be filled, it is possible to reduce the consumed power, thereby implementing low power.

Specific effects together with the above-described effects are described together with a description of the following detailed matters for carrying out the present disclosure.

Although the present disclosure has been described above with reference to exemplary drawings, the present disclosure is not limited by the embodiments and drawings disclosed herein, and it is apparent that various modifications can be made by those skilled in the art within the scope of the technical spirit of the present disclosure. In addition, even when the operational effects according to the configuration of the present disclosure have not been explicitly described in the description of the embodiments of the present disclosure, it goes without saying that the effects predictable by the corresponding configuration should be recognized.

What is claimed is:

1. An in-cell touch display device, comprising:
a substrate;
a transistor formation layer on the substrate, the transistor formation layer including a semiconductor, a source electrode connected to the semiconductor, a drain electrode connected to the semiconductor, a gate electrode that overlaps the semiconductor, and a plurality of touch lines; and a light emitting element layer on the transistor formation layer, the light emitting element layer including an anode electrode, an emission layer on the anode electrode, a cathode electrode on the emission layer, and a bank layer on a portion of the anode electrode, wherein the cathode electrode is connected to a touch line from the plurality of touch lines, and the plurality of touch lines are closer to the cathode electrode than to the source electrode and the drain electrode, and wherein the touch line is non-overlapping with the semiconductor, the source electrode, the drain electrode, and the gate electrode in a plan view of the in-cell touch display device.

2. The in-cell touch display device of claim 1, wherein the touch line is non-overlapping with the semiconductor, the source electrode, the drain electrode, and the gate electrode in the transistor formation layer.

3. The in-cell touch display device of claim 1, wherein the cathode electrode is integral across the light emitting element layer.

4. The in-cell touch display device of claim 1, wherein the touch line is on a planarization layer that is on the semiconductor, the source electrode, the drain electrode, and the gate electrode in the transistor formation layer.

5. The in-cell touch display device of claim 4, further comprising:

a contact hole in at least one of the bank layer, the emission layer, and a portion of the anode electrode that overlap the touch line, and the cathode electrode is electrically connected to the touch line through the contact hole.

6. The in-cell touch display device of claim 1, wherein, during a touch period, a low potential modulation voltage having a predetermined cycle and a predetermined amplitude is applied to at least one of the cathode electrode and the touch line.

7. The in-cell touch display device of claim 1, further comprising:

a sensing circuit configured to detect a touch signal by amplifying a signal of the touch line, differentiating the amplified signal, and integrating the differentiated signal a plurality of times.

8. The in-cell touch display device of claim 7, wherein the sensing circuit includes:

a sensing resistor having a first end connected to the touch line and a second end connected to a supply terminal of a low potential power voltage;

an amplifier circuit connected to the sensing resistor, the amplifier circuit amplifying a voltage corresponding to a difference between voltages applied to the first end and the second end of the sensing resistor;

a differential capacitor having a first end connected to an output terminal of the amplifier circuit and a second end;

a first integrator circuit connected to the second end of the differential capacitor, the first integrator circuit integrating an output signal of the differential capacitor; and a second integrator circuit connected to the first integrator circuit, the second integrator circuit integrating an output signal of the first integrator circuit.

9. The in-cell touch display device of claim 8, wherein, during a touch period, a low potential modulation voltage having a predetermined cycle and a predetermined amplitude is applied to the cathode electrode and the touch line, and a reference voltage having the predetermined cycle and the predetermined amplitude is applied to the first integrator circuit and the second integrator circuit.

10. An in-cell touch display device, comprising:

a display panel including a plurality of sub-pixels having a light emitting element and a thin film transistor, the display panel including a touch line on a backplane of the thin film transistor, and the light emitting element including a cathode electrode connected to the touch line; and a sensing circuit configured to sense a touch signal by amplifying a signal of the touch line, differentiating the amplified signal, integrating the differentiated signal to generate an integrated signal, and integrating the integrated signal, wherein, during a touch period of the in-cell touch display device, a low potential modulation voltage having a predetermined cycle and a predetermined amplitude is applied to the cathode electrode and the touch line, and a reference voltage having the predetermined cycle and the predetermined amplitude same as the low potential modulation voltage is applied to the sensing circuit.

11. The in-cell touch display device of claim 10, wherein the plurality of sub-pixels are partitioned into a plurality of areas, an area of the plurality of areas including a predetermined number of sub-pixels of the plurality of sub-pixels is a touch unit, and cathode electrodes of the predetermined number of sub-pixels in the touch unit are connected to a same touch line of a plurality of touch lines.

12. The in-cell touch display device of claim 11, wherein the cathode electrodes are integral for the plurality of sub-pixels.

13. The in-cell touch display device of claim 11, wherein the sensing circuit includes:

a sensing resistor having a first end connected to the touch line and a second end connected to a supply terminal of a low potential power voltage;

an amplifier circuit connected to the sensing resistor, the amplifier circuit amplifying a voltage corresponding to a difference between voltages applied to the first end and the second end of the sensing resistor;

a differential capacitor having a first end connected to an output terminal of the amplifier circuit and a second end;

a first integrator circuit connected to the second end of the differential capacitor, the first integrator circuit integrating an output signal of the differential capacitor; and a second integrator circuit connected to the first integrator circuit, the second integrator circuit integrating an output signal of the first integrator circuit.

14. The in-cell touch display device of claim 13, wherein, during the touch period, the low potential modulation voltage having the predetermined cycle and the predetermined amplitude is applied to the second end of the sensing resistor through the supply terminal.

15. The in-cell touch display device of claim 13, wherein the amplifier circuit includes:

a first input resistor having a first end connected to the first end of the sensing resistor and a second end;

a second input resistor having a first end connected to the second end of the sensing resistor and a second end;

a first operational amplifier circuit having a first input terminal connected to the second end of the first input resistor and a second input terminal connected to the second end of the second input resistor; and a feedback resistor connected to the first input terminal and an output terminal of the first operational amplifier circuit.

16. The in-cell touch display device of claim 15, wherein the first integrator circuit includes:

a second operational amplifier circuit having a third input terminal that receives a signal output through the differential capacitor and a fourth input terminal to which the reference voltage is applied; and a first feedback capacitor connected to the third input terminal and an output terminal of the second operational amplifier circuit, and wherein the second integrator circuit includes:

a third operational amplifier circuit having a fifth input terminal that receives an output signal of the first integrator circuit and a sixth input terminal to which the reference voltage is applied; and a second feedback capacitor connected to the fifth input terminal and an output terminal of the third operational amplifier circuit.

17. The in-cell touch display device of claim 16, further comprising:

a transfer resistor connected to an output terminal of the first integrator circuit and the fifth input terminal of the second integrator circuit.

18. The in-cell touch display device of claim 16, further comprising:

a switch circuit connected to an output terminal of the first integrator circuit and the fifth input terminal of the second integrator circuit, wherein the switch circuit transmits, to the second integrator circuit, a first signal rising from a low level to a high level, or the switch circuit transmits, to the second integrator circuit, a second signal falling from the high level to the low level.

19. The in-cell touch display device of claim 13, wherein, during the touch period, the reference voltage having the predetermined cycle and the predetermined amplitude same as the low potential modulation voltage is applied to the first integrator circuit and the second integrator circuit.

20. The in-cell touch display device of claim 11, wherein the sensing circuit includes:

a first sensing resistor having a first end connected to a first touch line of the plurality of touch lines and a second end connected to a supply terminal of a low potential power voltage;

a first amplifier circuit connected to the first sensing resistor, the first amplifier circuit outputting a first amplified voltage by amplifying a first voltage corresponding to a difference between voltages applied to the first end and the second end of the first sensing resistor;

a second sensing resistor having a first end connected to a second touch line of the plurality of touch lines and a second end connected to the supply terminal of the low potential power voltage;

a second amplifier circuit connected to the second sensing resistor, the second amplifier circuit outputting a second amplified voltage by amplifying a second voltage corresponding to a difference between voltages applied to the first end and the second end of the second sensing resistor;

a first differential capacitor having a first end connected to an output terminal of the first amplifier circuit and a second end connected to an input terminal of a first integrator circuit;

a second differential capacitor having a first end connected to an output terminal of the second amplifier circuit and a second end connected to an input terminal of the reference voltage of the first integrator circuit;

the first integrator circuit configured to:

receive a first output signal of the first differential capacitor and a second output signal of the second differential capacitor; and integrate the first output signal and the second output signal to generate an output signal; and a second integrator circuit having an input terminal connected to an output terminal of the first integrator circuit, the second integrator circuit configured to:

receive the output signal of the first integrator circuit and the reference voltage of the first integrator circuit; and integrate the output signal of the first integrator circuit and the reference voltage.

* * * * *